United States Patent [19]
Perkins et al.

[11] Patent Number: 5,271,582
[45] Date of Patent: * Dec. 21, 1993

[54] MODULAR MOTHER SATELLITE BUS FOR SUBSIDIARY PAYLOADS

[75] Inventors: Frederick W. Perkins, McLean, Va.; Phil Kananen, Suitland, Md.

[73] Assignee: Standard Space Platforms Corp., McLean, Va.

[ * ] Notice: The portion of the term of this patent subsequent to Oct. 6, 2009 has been disclaimed.

[21] Appl. No.: 877,145

[22] Filed: May 1, 1992

Related U.S. Application Data

[63] Continuation of Ser. No. 545,654, Jun. 29, 1990, Pat. No. 5,152,482.

[51] Int. Cl.$^5$ .............................................. B64G 1/00
[52] U.S. Cl. ............................................. 244/158 R
[58] Field of Search ........................... 244/158 R, 159

[56] References Cited

U.S. PATENT DOCUMENTS

| | | | |
|---|---|---|---|
| Re. 27,903 | 1/1974 | Fogarty | 244/150 |
| T100,604 | 5/1981 | Crill et al. | 244/158 R |
| 3,380,687 | 4/1968 | Wrench et al. | 244/1 |
| 3,420,470 | 1/1969 | Meyer | 244/1 |
| 3,431,854 | 3/1969 | Rabenhorst | 102/49.4 |
| 3,461,801 | 4/1969 | Vitale et al. | 102/37.6 |
| 3,478,986 | 11/1969 | Fogarty | 244/1 |
| 3,547,375 | 12/1970 | Mackey | 244/1 |
| 3,652,042 | 3/1972 | Welther | 244/155 |
| 3,709,447 | 1/1973 | Devlin | 244/158 R |
| 3,907,225 | 9/1975 | Welther | 244/158 R |
| 3,929,306 | 12/1975 | Faget et al. | 244/162 |
| 4,359,201 | 11/1982 | Thomson et al. | 244/158 R |
| 4,384,692 | 5/1983 | Preukschat | 244/158 R |
| 4,395,004 | 7/1983 | Ganssle et al. | 244/158 R |
| 4,508,404 | 4/1985 | Frawley | 244/161 |
| 4,554,905 | 11/1985 | Smyly et al. | 124/56 |
| 4,618,111 | 10/1986 | Sherwood et al. | 244/158 R |
| 4,664,343 | 5/1987 | Lofts et al. | 244/158 R |
| 4,728,060 | 3/1988 | Cohen | 244/159 |
| 4,728,061 | 3/1988 | Johnson et al. | 244/164 |
| 4,744,533 | 5/1988 | Mullen | 244/159 |
| 4,747,567 | 5/1988 | Johnson et al. | 244/173 |
| 4,771,971 | 9/1988 | Ludwig et al. | 244/161 |
| 4,834,325 | 5/1989 | Faget et al. | 244/173 |
| 4,860,974 | 8/1989 | Barnett et al. | 244/158 R |
| 4,872,625 | 10/1989 | Filley | 244/159 |
| 4,878,637 | 11/1989 | Mullen | 244/159 |
| 4,880,187 | 11/1989 | Rourke et al. | 244/158 R |
| 4,903,919 | 2/1990 | Johnson et al. | 244/161 |
| 4,921,432 | 5/1990 | Ferree | 439/164 |
| 4,964,596 | 10/1990 | Ganssle et al. | 244/158 R |
| 5,050,821 | 9/1991 | Kerstein et al. | 244/158 R |

OTHER PUBLICATIONS

Hitchhiker Capabilities, Goddard Space Flight Center, Jan., 1990, pp. 1-8.

*Primary Examiner*—Joseph F. Peters, Jr.
*Assistant Examiner*—Anne E. Bidwell
*Attorney, Agent, or Firm*—Nixon & Vanderhye

[57] ABSTRACT

Multiple subsidiary small payloads are connected to standard mechanical and electrical interfaces provided by an expendable or recoverable modular mother satellite bus (MMSB) and launched into space as an assembly acting as a common carrier providing low unit launch costs for the attached subsidiary payloads and also providing a variety of electrical, pointing, and thermal control services for these payloads after reaching orbit. These services include but are not necessarily limited to controlled separation of free-flying satellites or re-entry vehicles, regulated electric power at a variety of voltages, telemetry, computer control, payload control via time delayed pre-programmed instructions, optional real-time payload control via direct radio communication or transmission through geostationary or other communication satellite links, time-driven or event-driven control logic, mass data memory, encryption and decryption of data and commands, payload pointing, augmented heat rejection, and interconnection between subsidiary attached payloads through the data bus.

33 Claims, 16 Drawing Sheets

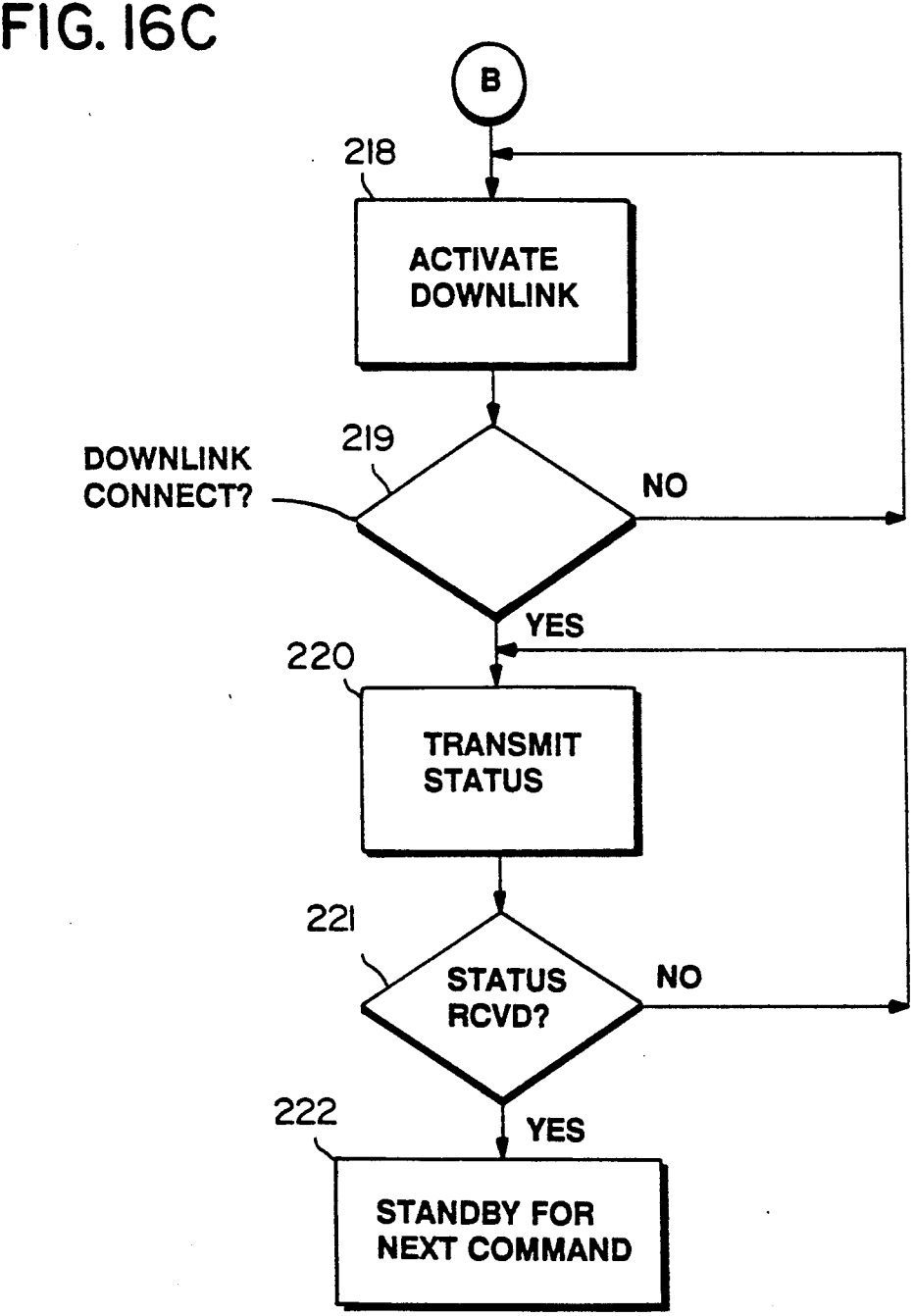

MODULAR MOTHER SATELLITE BUS FOR SUBSIDIARY PAYLOADS

This is a continuation of application Ser. No. 07/545,654, filed Jun. 29, 1990 now U.S. Pat. No. 5,152,482.

BACKGROUND OF THE INVENTION

This invention generally relates to the launching into space of multiple payloads, and specifically to the provision of continuing support services for such payloads.

Large spacecraft, including the Shuttle and large expendable satellites, are typically comprised of one or a few large and many more small individual payloads. For example, the Voyager spacecraft, best known for the dramatic photographs taken of the outer planets, carries magnetometers, radiation detectors, and other small experiments which continue to send back data long after the primary photographic missions have ended. As another example, large communications satellites often contain several different transponders (radio receiver/transmitter pairs). All of these spacecraft to date have been single purpose, customized designs. None offered significant modularity or adaptability.

A proposed Industrial Space Facility contained provisions for several attached payloads within a pressurized volume. The Space Shuttle fleet includes provisions for attached payloads, including the pressurized mid-deck lockers, unpressurized Get Away Special canisters (known as GAS cans), and the Hitchhiker program attachment points which provide limited bus services to attached payloads. Several devices, including the Spacelab and Spacehab have been designed to extend the Shuttle pressurized or unpressurized payload bay capabilities. All of these programs, however, suffer from shortcomings which the Modular Mother Satellite Bus (MMSB) for attached payloads of this invention will rectify.

The above mentioned Industrial Space Facility, which was never made operational, was a very large and expensive design which would have required the entire lift capability of a Shuttle for launch, as well as periodic tending by Shuttle based astronauts. It was intended to be pressurized so that astronauts could work inside, but as designed, had limited capability for supplying bus services to attached unpressurized payloads.

The Shuttle GAS cans are unique to the Shuttle. These are passive devices, and are not provided any substantial bus services. They do not exercise pointing control authority over the Shuttle, and suffer the restrictions of operating exclusively in the Shuttle payload bay, including the expense of man-rating all equipment, re-radiation of infra-red light from the Shuttle structure, environmental contamination due to water and propulsion byproducts emitted by the Shuttle, and radio frequency energy in the vicinity of the Shuttle making certain experiments difficult or impossible to perform.

The Shuttle Hitchhiker program provides limited bus services to attached payloads but only operates within the Shuttle payload bay. The relatively short duration of the Shuttle flights is a severe limitation for certain experiments requiring long orbital flights. Hitchhiker payload pointing is also not provided as a Shuttle bus service.

The Spacelab platform operates only as a Shuttle attached payload. It includes provision for certain attached payloads as well as internal pressurized volume, but must be specially configured and extensively reworked for each payload.

The Spacehab module will also operate exclusively as a Shuttle attached payload and provides additional pressurized volume, extending the Shuttle mid-deck volume. It does not provide any additional bus services, but distributes standard services provided by the Shuttle to the internal payloads.

The EURECA platform was built in Europe and is designed to accommodate several payloads. Nevertheless, the craft was intended to carry a specific array of attached payloads and for a unique mission, supported by all of the payloads. It did not contain any provisions for incorporation of as yet undesigned payloads, standard interface features, or significant modularity.

This invention is designed specifically to ease these limitations by providing an unmanned expandable or recoverable craft enabling multiple attached subsidiary payloads with unrelated functions to be launched as either primary or secondary payloads on conventional expendable rockets (or on one of the Space Shuttles), and to share space launch and orbital flight services, thereby reducing cost, improving the payload environment, and increasing the bus services available to attached payloads exposed to the space environment.

SUMMARY OF THE INVENTION

In accordance with an exemplary embodiment of the invention, an apparatus or craft is provided for launching into orbit in the manner of a common carrier, multiple subsidiary attached payloads, and providing continuing bus services for such payloads after reaching orbit. These bus services may include, but are not necessarily limited to, controlled separation for payload free-flight or re-entry after arbitrary duration of attachment to the MMSB; electric power; telemetry; computer control; payload control via time delayed pre-programmed instructions; real-time payload control via direct radio communication or transmission through geostationary satellite links, encryption and decryption of data and commands; either time-driven or event-driven control logic; mass data memory; time-shared payload orientation or "pointing"; heat rejection; kilowatts of electrical power for useful periods, and electrical connection between subsidiary payloads through the data/command buses.

These services are provided by means of structural support elements which make up the MMSB craft, and which mate with the launch vehicle and the attached subsidiary payloads, and which may also support a separate payload (provided by a third party but not functionally part of the MMSB assembly) for launch and orbital separation only. The MMSB assembly includes electronic apparatus for distribution of bus services; electronic apparatus to exercise payload control either by means of preprogrammed instructions or via real-time radio links which may be direct from the ground station or provided by geostationary (or other altitude) communication satellites; deployable solar panels attached to the main structural elements of the craft for electric power generation; standard interface ports which adapt the attached payloads to the main structural element of the craft; thermal radiators which are connected to the attached payloads by an internal ammonia heat pipe bus and provide enhanced subsidiary payload heat rejection capability; and software appropriate for the operation and control of the MMSB.

In an exemplary embodiment, the MMSB spacecraft incorporates the following subsystems:

MMSB mechanical structure
Attitude control subsystem
Communications subsystem
Digital subsystem
Payload interfaces
Power subsystem
Pyrotechnic device subsystem
Thermal control subsystem Each of these systems will be described in detail further herein.

Subsidiary payloads are attached to the MMSB by means of standard mechanical and electrical adapters. These include multi-contact adapters for data, electrical power, and interconnection of subsidiary payloads; a leakproof fitting connecting the subsidiary payloads to the ammonia heat pipe bus; and mechanical devices for reversibly or fixedly attaching the payloads to the main structural components of the MMSB.

The MMSB is connected to the selected launch vehicle also by means of commercially available standard adapters, and is also separated from the vehicle upon achieving orbit by conventional means. In this regard, the MMSB may be launched into earth orbit on any one of many available launch vehicles, including but not limited to the SHUTTLE, ATLAS, TITAN, DELTA, ARIANE, TAURUS or other rocket series, as either a primary or secondary payload. Additional payloads not functionally integrated with the MMSB except for separation and/or telemetry relay may also be attached to the craft for launch purposes only. Following launch, these additional free-flying payloads may be separated from the MMSB at any pre-determined time, while the remaining attached subsidiary payloads are activated and their functions performed as controlled by the spacecraft computer/controller.

It will be further understood that, if desired, the MMSB may be scheduled for recovery by the Shuttle or other means in the event one or more payloads are to be returned to earth.

Bus functions are provided to the subsidiary payloads via electronic and electrical buses, a thermal bus, and a plurality of interface control units (ICUs). Each ICU is an electronic device that adapts the electronic characteristics of an associated payload to the main electronic bus, decodes power command signals, provides electrical power to the subsidiary payloads per the control commands, provides analog to digital and digital to analog conversion of electrical signals, and provides bus service usage data back to the main controller for subsequent transmission to the ground station. The data bus and power bus are both connected to each ICU, providing full access to required services for each subsidiary attached payload. This arrangement also maintains full services to all other payloads in the event of a failure in one or more ICU's.

Electrical power is provided in a variety of standard regulated voltages, e.g. 0, +5 Vdc, +15 Vdc, −15 Vdc, +28 Vdc. The electrical power system also provides large amounts of unregulated heater power, more than 1 kilowatt for sustained periods, for appropriate attached payloads. The regulated voltages are generated by DC/DC voltage conversion of the battery output bus voltage by standard means. Unregulated DC power is provided by direct (fused) connection to the battery bus. DC/DC voltage conversion may be accomplished by commercial converters, for example those produced by VICOR Inc.

Electrical power is produced by solar cells arranged on a pair of deployable solar panels attached to the craft. This solar panel configuration is standard practice in the industry, and deployable panels are available from many companies including Lockheed, TRW, and others. The electric power so produced is stored in nickel/cadmium rechargeable batteries or some other suitable medium and dispensed through the power distribution system and ICU to the subsidiary attached payloads and to the MMSB control, guidance, and radio transmission electronics.

The MMSB data/control bus system and payload interface architecture provides an electronic environment that is independent of the subsidiary attached payload electronic configuration. The hardware and software investment required to accommodate various attached payload electronic configurations is thus minimized. This electronic architecture is based in part on the approved IEEE Standard "ANSI/IEEE Std. 1296-1987" relating to a multiple bus structure supported by numerous vendors in the electronics industry. This bus structure, when augmented by standardized payload interface hardware and software, allows the integration of dissimilar subsidiary attached payloads which may contain a wide variety of electronic control and data requirements ranging from direct payload control by conduction of ICU control voltages originating in stored spacecraft controller commands, to multiple processor/high bandwidth based systems providing real-time experiment control via real-time communications links.

It will therefore be appreciated that the spacecraft in accordance with this invention is at once adaptable to a wide variety of existing and proposed payloads, and inexpensive enough to allow frequent flight repetition. The invention provides a means for establishing a transparent space launch and orbital flight service in the manner of a common carrier, standardizing interfaces, providing value added bus services, and offering frequent periodic launch opportunities for small payloads on a variety of launch vehicles at greatly reduced cost.

In one aspect, therefore, the present invention relates to an unmanned spacecraft comprising:

(a) a central structural support column;

(b) a plurality of standardized interface ports arranged on the support column for attachment of a corresponding plurality of functionally unrelated payloads;

(c) modular interface control units incorporated within each of the interface ports; and (d) means within the support column for providing each payload with multiple orbital flight support services after launch via the interface control units.

In another aspect, the present invention provides an unmanned unpressurized spacecraft for launch and orbital support of a plurality of subsidiary attached payloads comprising: standardized interface means for attaching a plurality of subsidiary payloads to a main structural body of the spacecraft; means for controlling the function of each of the attached subsidiary payloads; means for providing spacecraft electric power and computer/controller and data bus resources to each of the attached subsidiary payloads; means for retrieving data from the attached subsidiary payloads; and means for communicating with the spacecraft.

In still another aspect, the present invention provides, in a spacecraft for transporting a plurality of diverse customer payloads, a communication system for electronically communicating with the payloads comprising: a digital subsystem including control means for communicating with the plurality of payloads; at least one bus coupled to the digital subsystem over which the digital subsystem communicates with the plurality of payloads; and a plurality of substantially identical interface control units, each interface control unit being coupled to at least one bus and to a customer payload, whereby substantially identical interface control units may be used to interface between the digital subsystem and a plurality of diverse customer payloads.

Other objects and advantages of the invention will become apparent from the detailed description which follows:

DESCRIPTION OF THE PREFERRED EMBODIMENT

Before discussing the various Figures in detail, it should be noted that the apparatus illustrated in FIGS. 1-6 are simplified diagrammatic views which omit various details in the interest of clarity and ease of understanding.

FIGS. 1-5 illustrate the MSSB 10 in accordance with one exemplary embodiment of the invention. The MSSB includes a main column 12 which is the major structural element supporting the subsidiary attached payloads 14, secondary payloads 14' and other subassemblies during launch and orbit.

Figure 1:
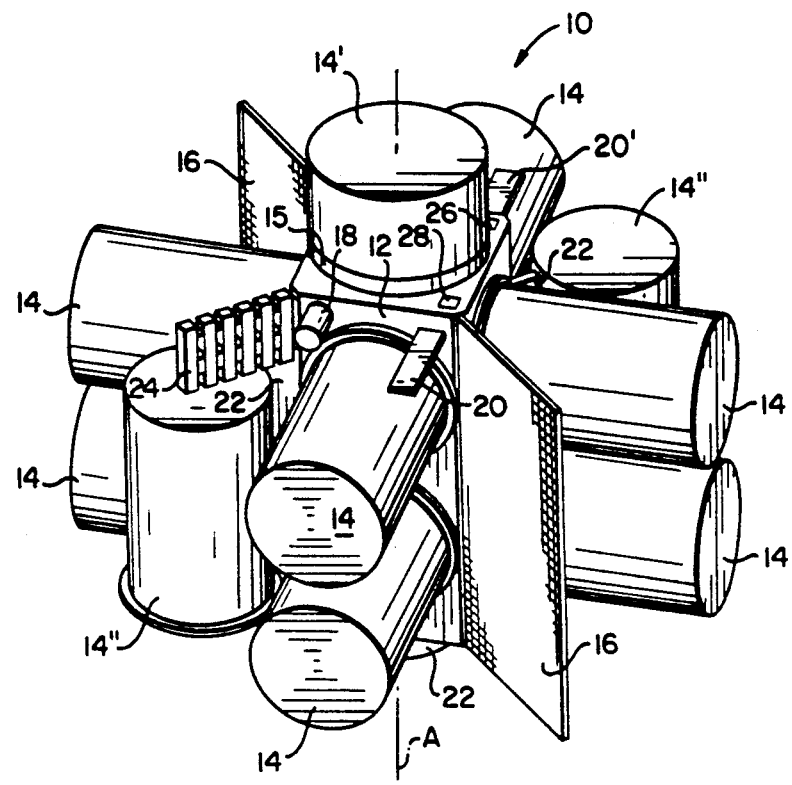
FIG. 1 is a perspective view of a modular mother satellite bus with payloads attached in accordance with an exemplary embodiment of the invention.

In FIG. 1 the column 12 is shown as a generally rectangular housing, closed at either end. It will be appreciated, of course, that the column 12 may have other configurations which are nevertheless within the scope of this invention. The significant aspect of the column 12 is that it provides standardized interfaces for the attached payloads, and houses the electronic components and other devices necessary to provide the continuing support services to the payloads during orbit.

The structural column 12 is preferably manufactured from rolled aluminum alloy with a welded seam. It has sufficient strength to sustain the launch loads even with a substantial secondary payload attached via the secondary payload adapter. It provides a carriage for all of the subsidiary attached payloads 14 and associated components and subassemblies. The preferred material is available as a machined item from any of several manufacturers.

In an exemplary arrangement, the column 12 is approximately 81.5 inches long, with a dynamic envelope (with payloads attached) of about 90 inches in diameter.

Subsidiary payloads 14 are shown as being enclosed in containers similar to the Shuttle GAS cans described above. Whether or not the payloads are enclosed in this manner is to be determined by the customer. It will be appreciated that the payloads can have numerous other configurations, such as, for example, the secondary payload shown at 14'.

Secondary payload adapters shown at 15 comprise a means by which a functionally unrelated secondary payload may be launched as part of the assembly and separated upon achieving orbit, or an additional subsidiary attached payload launched and integrated into the MMSB by means of a standardized or modular interface port described below. The secondary payload adapter 15 is manufactured from machined aluminum and is capable of sustaining the loads imposed on it by launch. It is also compatible with the standard interface hardware and an ICU. It is attached to the main structural column by means of a welded seam or bolted connection. It is available from many vendors.

Attached to the main structural column 12 are a pair of conventional deployable solar arrays or panels 16. These panels are shown in FIGS. 1, 2, 4 and 5 in a retracted or launch configuration, and in FIG. 3 in an extended or orbital configuration.

A pair of low gain S-band antennae 18, 18' for enabling radio communications with geosynchronous satellite or earthbound ground stations, and a pair of low gain UHF antennae 20, 20' for enabling backup ground station communications capability are mounted at one end of the column 12.

Additional adaptable connection points 22 may be provided on opposite diagonal corners the column 12 for attachment of other subsidiary or functionally unrelated payloads, e.g., such as payloads 14", that share the launch, but which will be separated from the MMSB after launch.

A thermal radiator 24 is mounted at an upper corner of the column 12 and is connected to an internal ammonia heat pipe bus within the column (described further herein) to provide an augmented subsidiary payload heat rejection capability. A sun sensor 26 and a horizon crossing indicator 28 provide inertial reference information for the attitude control system, also discussed further herein.

The MMSB 10 is designed to fly in normal operation with the long axis A of the main structural column 12 tangent and parallel to the flight path, such that certain of the attached payloads 14 or 14' will always have visibility of the earth (and deep space only at low elevation angles), while certain other attached payloads 14 or 14' will always have visibility of deep space only. In all cases, the plurality of attached payloads 14 or 14' will have visibility of either deep space or the earth. These visibilities are achieved by arranging the attached subsidiary payloads 14 or 14' radially and axially about the long axis A of the main structural column 12 as shown. In addition, the solar arrays 16 are free to be rotated about the spacecraft axes to enhance capture of incident solar radiation or to enhance the visibility of certain attached payloads while leaving the primary structure undisturbed. This is accomplished by incorporation of conventional solar array drive servos, readily available from several vendors. Further in this regard, it is noted that suitable solar array panel locking hinges and solar array deployment mechanisms are commercially available and such structure need not be described in detail.

On command the MMSB can be oriented in such a way that payload apertures (not shown) may be pointed in any desired direction. This capability is a valuable commodity for payloads which need either celestial or geo-reference to perform their functions.

Figure 2:
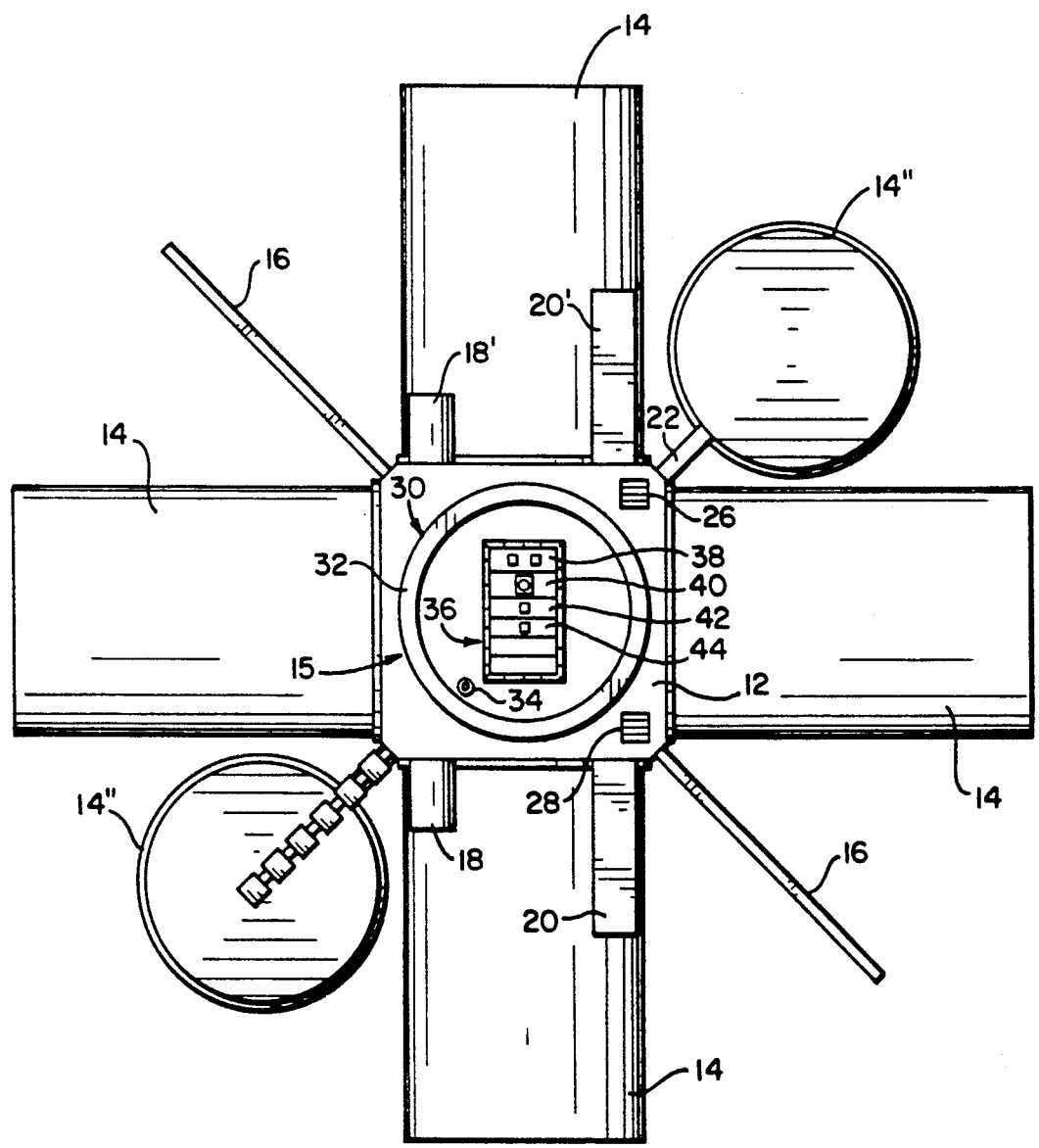
FIG. 2 is a plan view of the apparatus illustrated in FIG. 1.
Figure 3:
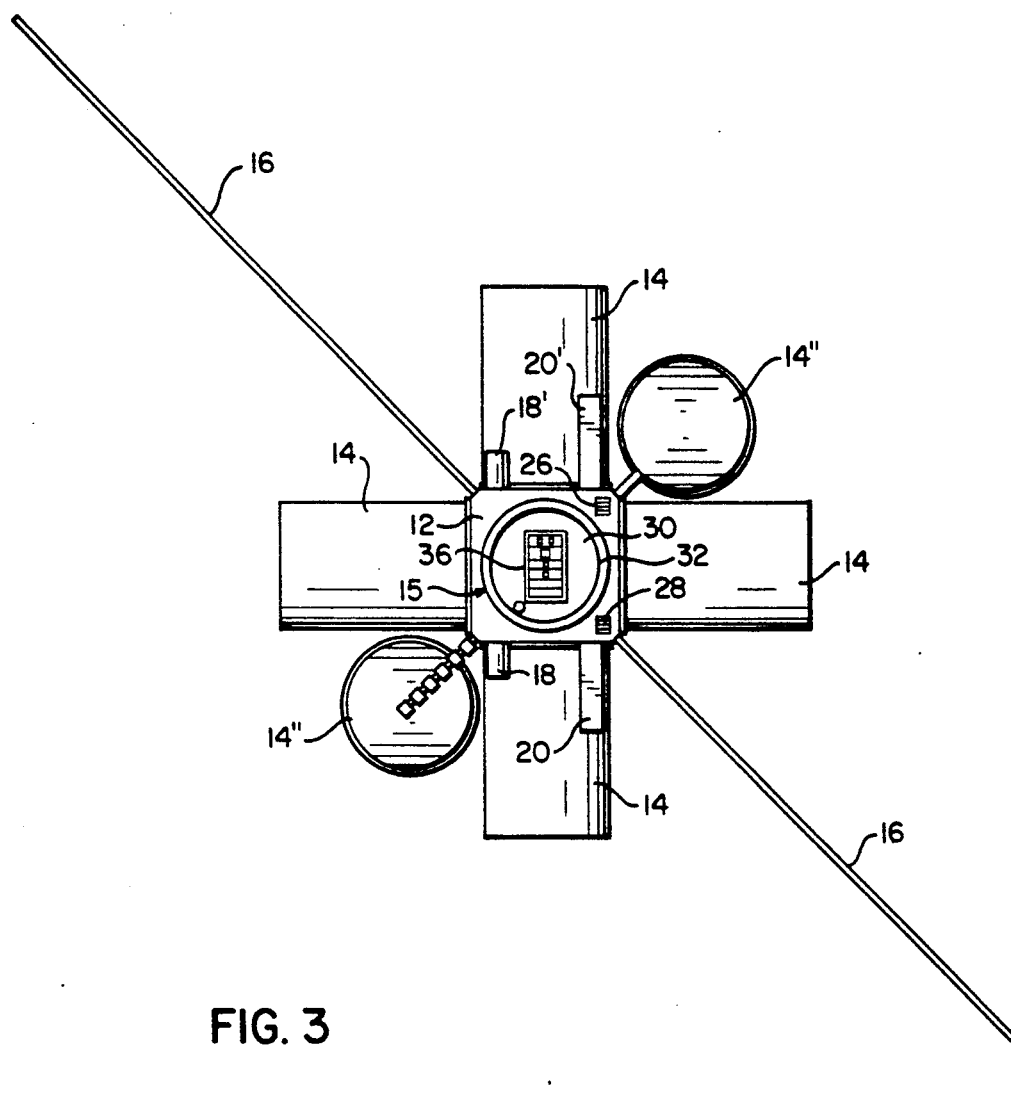
FIG. 3 is a plan view similar to that shown in FIG. 2 but on a reduced scale and with solar panels extended.

FIG. 2 also shows a standard interface port subassembly 30. Similar interface port subassemblies are utilized to attach all of the payloads 14 and 14'. These subassemblies, are configured to provide for subsidiary payload attachment and alignment, via the Marman ring flange attachment 32, power bus connection, data/command connection, customer interface port connection, thermal bus connection, and subsidiary payload separation and deployment subassemblies. In normal operation, many or all of the ports 30 will be populated with attached payloads 14 or 14'.

The Marman ring flange attachment is preferred as the structural adaptor for the interface unit 30 but is only one of many possible subsidiary payload attachment mechanisms. It has the advantage of extensive flight heritage, low cost, and the ability to be used as either a permanent attachment mechanism or, when used in conjunction with suitable bolt cutters and release assembly, as a means of deploying payloads into separate orbits following launch.

Referring again to FIG. 2, the modular subsidiary payload attachment port subassembly 30 at the top of the main structural column 12 includes a V-band flange 32 (see FIG. 6) which is attached to the main structural column 12 and allows either permanent or deployable attachment of subsidiary payloads 14 and/or 14', and an ammonia heat pipe bus subsidiary payload attachment 34 which provides enhanced heat rejection capability to the subsidiary payloads vis-a-vis the radiator 24. A connector plate 36 of an associated ICU (described below) provides the means by which the subsidiary payloads 14 and secondary payloads 14' are operatively connected to the MMSB.

In accordance with an exemplary embodiment of the invention, the plate 36 includes pyrotechnic interface 38 for connection to a payload deployment mechanism relating to those payloads which are to be separated from the MMSB after launch; the power bus interface connector 40 by which means the electrical power at several voltages as modulated by the ICU are brought to the subsidiary payloads; the data/command bus interface connector 42 by which means the control signals and data handling services modulated by the ICU are brought to the subsidiary payload; and the customer interface port connector 44 by which means two or more subsidiary attached payloads may be directly interconnected while bypassing the data/command bus.

The power bus, data/command bus and customer interface port connectors 40, 42 and 44, respectively, are also commercial grade space qualified multi-pin or separable electrical connectors.

The function and operation of these interface ports and associated ICU's will be described in further detail below.

Figure 4:
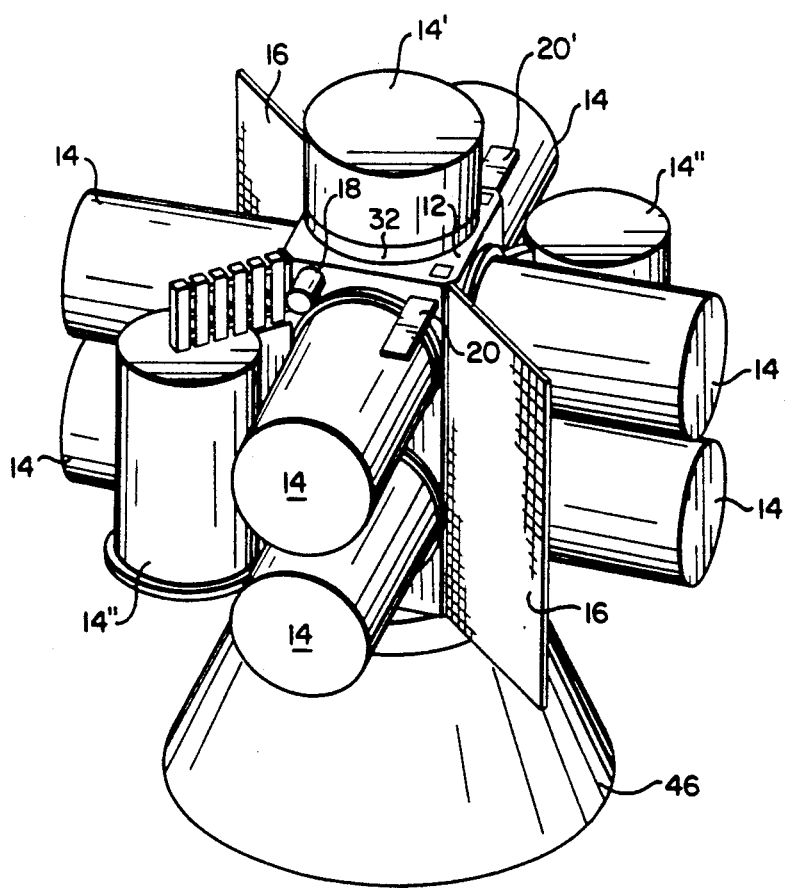
FIG. 4 is a perspective view of a modular mother satellite bus in accordance with an exemplary embodiment of this invention, with payloads attached and mounted on a launch vehicle adaptor.
Figure 5:
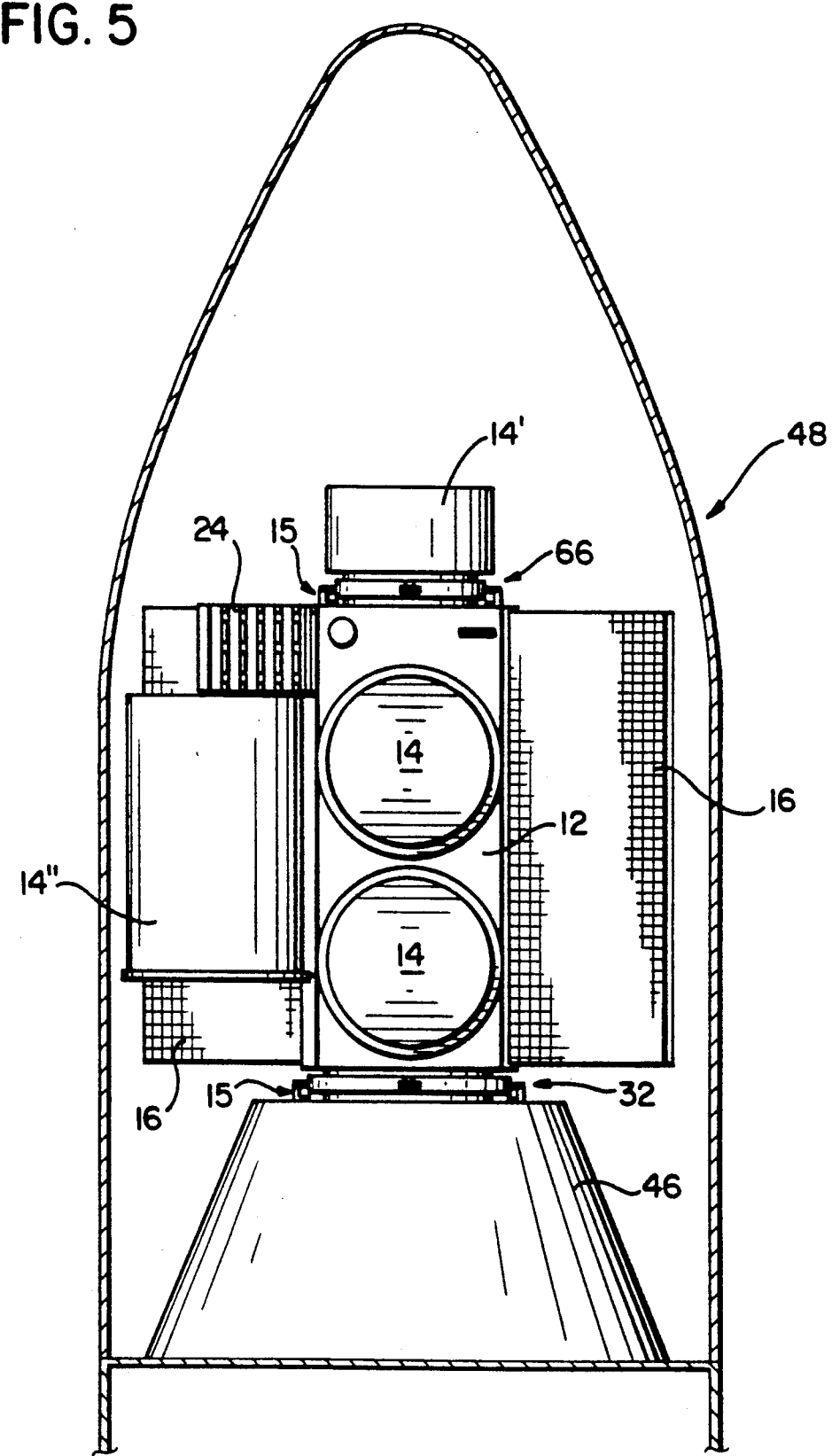
FIG. 5 is a diagrammatic side view of the satellite bus illustrated in FIGS. 1-4 mounted within the shroud of a launch vehicle.

With reference now to FIG. 4, the MMSB in accordance with an exemplary embodiment of this invention is shown mounted on a partially conically shaped rocket adaptor 46 utilized to mount the MMSB within the payload shroud of the rocket, as shown in FIG. 5. The launch adapter 46 is a passive structure which carries the launch induced loads from the base of the structural column 12 into the launch vehicle. As shown, it is made from rolled aluminum, riveted at the lap joint and attached to the launch vehicle by means of a Marman ring assembly. This is a standard approach to launch vehicle interface control. The separation mechanism is typically provided by the launch vendor and is under their control. Various launch adapters may be fixed to the MMSB to accommodate the various available launch vehicles.

FIG. 5 illustrates the MMSB in accordance with an exemplary embodiment of the invention mounted within a launch vehicle 48 via the mounting collar 46. The selection of the particular adaptor to be utilized with a specific launch vehicle is well within the skill of the art, as is the manner in which the MMSB is separated from the launch vehicle upon achieving the desired orbit. It is also noted that in FIG. 5, the solar panels 16 are shown in their retracted position for launch.

Figure 6:
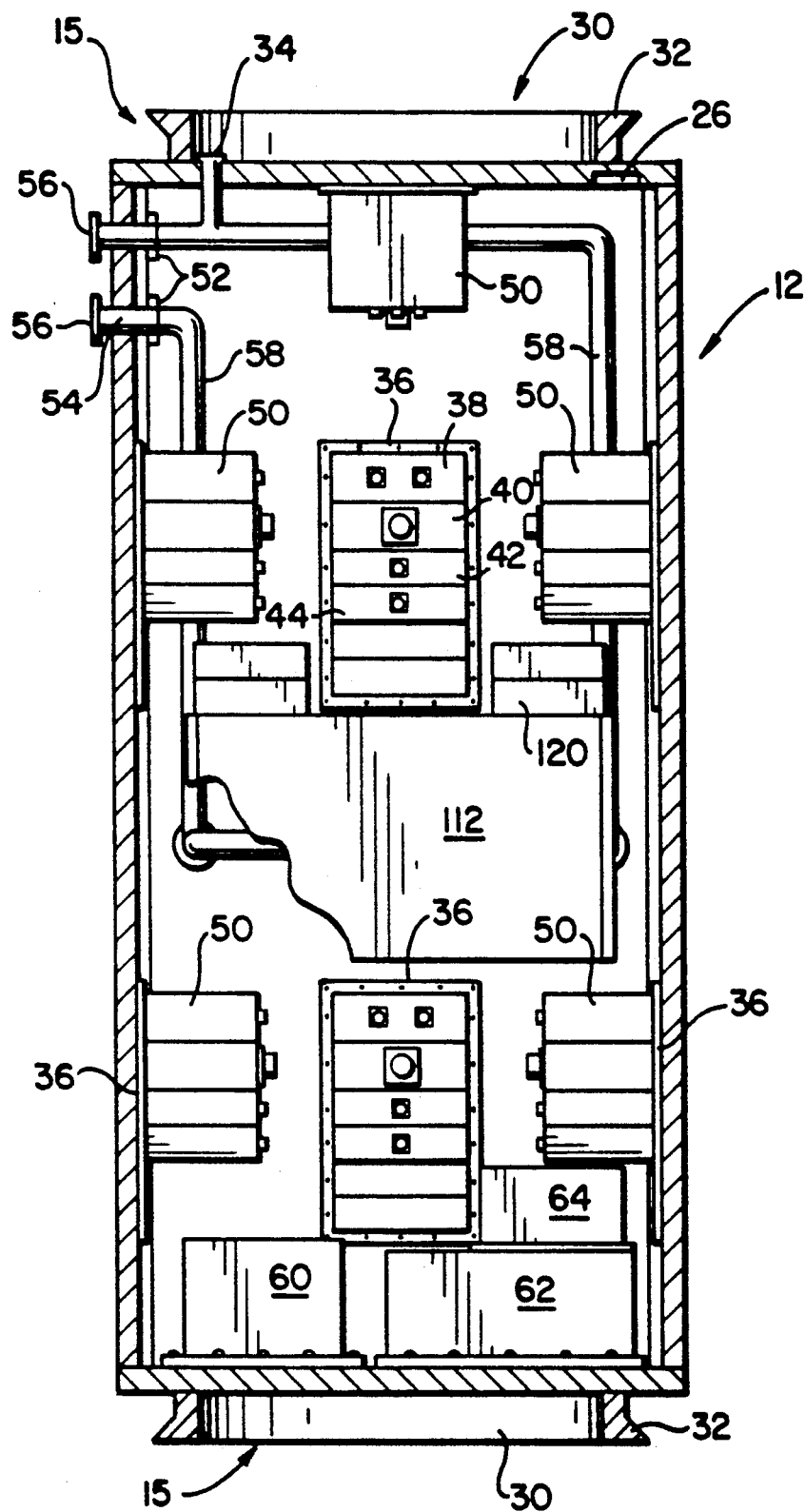
FIG. 6 is a diagrammatic side cross sectional view of a satellite bus in accordance with an exemplary embodiment of the invention.

Referring to FIG. 6, there is shown a diagrammatical cross sectional view of the main structural column 12 of the MMSB including upper and lower V-band flanges 32 and the general arrangement of the interface port assemblies 30. In this regard, each of the plates 36 serve to electrically connect the various payloads to an associated ICU 50 which will be described in greater detail below.

The ICU 50 is a plug-in module that can be removed from the MMSB by removable fasteners and reconfigured for particular payload configurations. This configuration allows payload electronic integration without major satellite disassembly or re-test. The power bus and data/command bus interconnections 40, 42, respectively, are integral with the ICU 50, and are automatically disconnected when removing the ICU and reconnected by inserting the ICU.

FIG. 6 also illustrates an ammonia heat pipe bus connection, located on a side wall of the column 12, including internally fluted extruded aluminum or sintered-metal lined aluminum tubes 58 connected at 52 with female inserts 54 and a threaded collar 56 by which means the heat pipe bus can be attached to the radiator 24. The attachment subassembly is connected to the main ammonia bus 58 internal to the MMSB main column 12 which is itself similarly constructed in the manner of standard ammonia heat pipes via a welded attachment such that fluid path continuity is maintained, allowing passage of liquid and gaseous ammonia to the payloads via port 34 and radiators as required for heat pipe operation. Ammonia heat pipes are well known and understood by those of ordinary skill in the art and are available from several commercial sources, including TRW and Dynatherm. This arrangement provides the subsidiary payloads with significant augmented heat rejection capability.

Finally, FIG. 6 also shows, in diagrammatic form, the attitude control system 60, battery stacks 62, and a power control unit 64. These components will be described further hereinbelow with respect to the associated electronics of the MMSB.

The known payload release and deployment subassembly connected via the pyrotechnic interface connector 38 operates in association with the V-band ring flanges 32 and associated clamps, and includes electro-explosive device control lines from the associated ICU 50 which provide the electrical energy required to fire the V-band bolt cutters, i.e., electro-explosive bolt cutters which cleave the tension bolts providing the V-band tensile clamp force by which means the clamp band is released and the attached payload is released from the main structure. The subassembly also includes springs which are used to restrain the V-band ring clamp band following payload release and fixedly attach it to the main structural column, separation springs which are compressed prior to assembly and provide the stored energy required to separate the payload, a plunger which is connected to the separation springs by which means stored launcher spring energy is transferred to the payload, a housing which contains the launcher subassembly parts and provides a load path to the main structure, and separable electrical connectors. Through the separable electrical connectors the subsidiary payloads 14 or 14' may be supplied with any or all other electrical bus services during their attachment through the ICU.

This payload release and deployment subassembly, shown generally at 66 in FIG. 5, provides a means by which subsidiary payloads may be rigidly attached to the main structural column 12 for an arbitrary length of time and then released upon command into a separate orbit. There are no operational restrictions placed on the payload or available bus services available from the MMSB because of potential separation into a separate orbit. Such release mechanisms have been built in many different configurations by many different manufacturers and are readily available.

Figure 7:
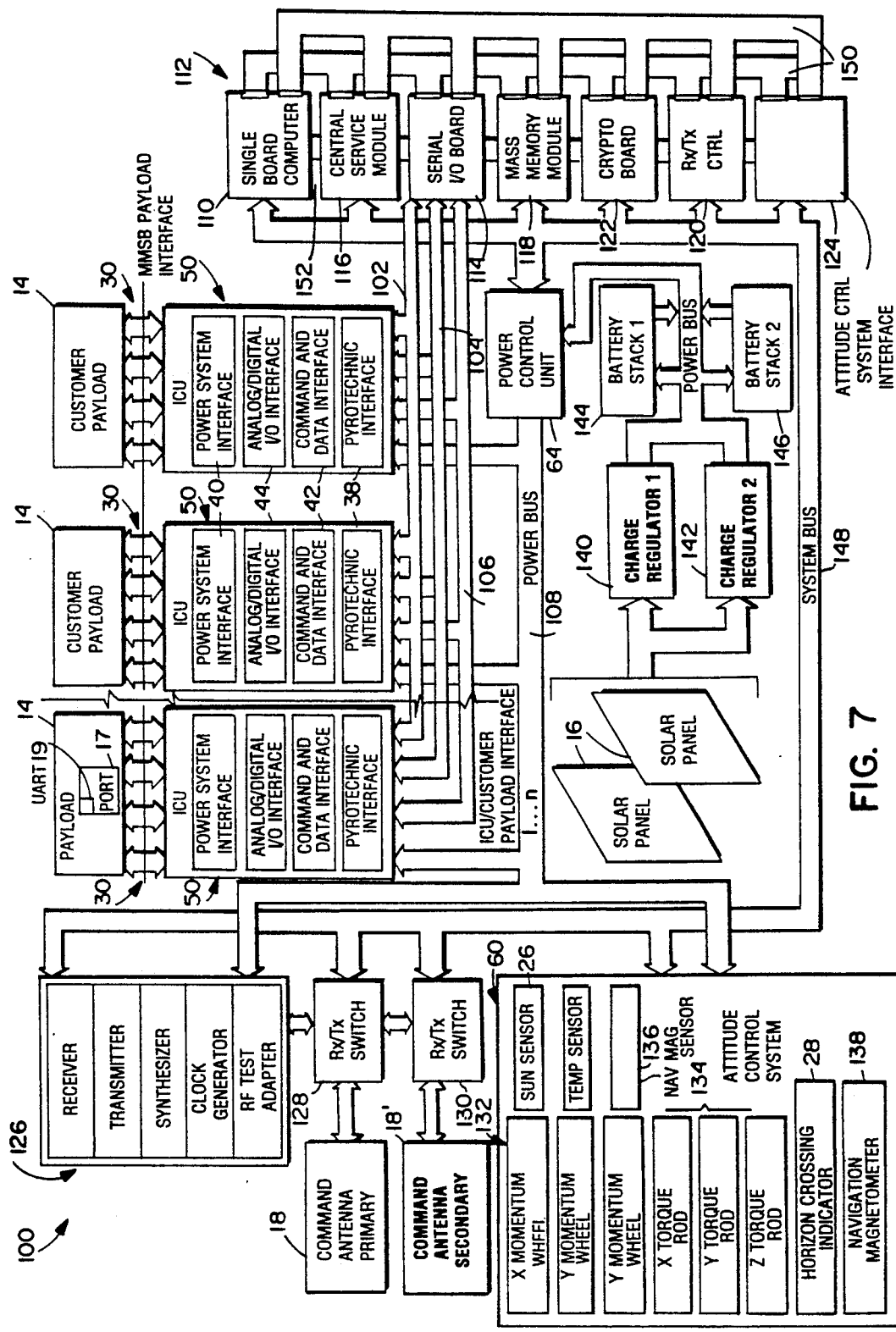
FIG. 7 is a block diagram illustrating the electronic system architecture in accordance with an exemplary embodiment of the invention.

FIG. 7 is a block diagram of an exemplary embodiment showing the electronic system architecture 100 employed in the present invention. As shown in FIG. 7, each of the customer payloads 14 is coupled to a common serial I/O bus 102, serial command and data bus 104, pyrotechnic bus 106, and power bus 108 via an interface control unit (ICU) 50. The input/output system bus 102 is a high speed asynchronous bus providing data and memory input/output capability to attached subsidiary payloads. The system may readily accommodate as many diverse customer payloads as the spacecraft is able to carry through the addition of further ICU's 50. Each ICU 50 communicates with computer/controller 110, and other components of digital subsystem 112 via serial I/O board 114, which may, for example, be a model MB11 186/157A. Each ICU 50 communicates with the customer payload 14, for example, via a conventional RS-232 communications port 17 (one shown in FIG. 7) having a universal asynchronious receiver transmitter (UART) 19 (one shown in FIG. 7). The communication port 19 may, for example, operate in a conventional null modem configuration.

In accordance with an exemplary embodiment of the present invention, the digital subsystem 112 includes a central service module 116, which may, for example, be a model MB11 200, which assigns and verifies slot ID's during system initialization. The central service module 116 serves as a bus arbiter/controller for controlling access to system bus 111. Coupled to service module is the single board computer 110 which may, for example, be a radiation hardened Intel 8086 microprocessor based computer with onboard RAM and DMA and which communicates with the payloads and with the ground station in accordance with the flowcharts of FIGS. 16 A-C as described below.

The digital subsystem 112 also includes a memory board 118 which may, for example, be a 4 megabyte dual ported dynamic RAM module. The mass memory is implemented as a solid state CMOS memory board which provides data storage for the digital subsystem 112 and for ground communications. Such a memory device is available from commercial sources, including Fairchild, Toshiba, and others. Other available mass memory devices may be substituted for the CMOS memory, including space qualified tape recorders, such as those available from Kodak.

As noted above, the digital subsystem 112 communicates with the customer payloads, 14, 14' (and associated ICU's 50) via, for example, the 10-Channel serial communications board 114 which provides ten RS-232 or RS-422 ports for payload asynchronous system bus communications and uplink/downlink command and control via the I/O bus 102 and the command and data bus 104.

The digital subsystem 112 also includes RX/TX controller 120 which may, for example, be a model MB11 800, and which provides receiver/transmitter control outputs and receives receiver/transmitter status inputs communications may be secured, if desired, through the use of Crypto Board 122 which provides for uplink/downlink encryption. The crypto chip set is supplied by The National Security Agency and is classified.

A conventional attitude control system Interface 124, which may, for example, be a model MB11 186/401, provides control outputs and monitors the status of the attitude control system 60. The digital system 112, may be expanded as desired to, for example, include further mass storage and parallel I/O.

The customer payloads may transmit and receive information via a conventional transmitter and receiver 126 primarily under the control of receiver/transmitter controller 120 and computer 110 by means of which all communications are controlled.

The primary radio transmitter and receiver 126 operate in S-band to provide high data rates and compatibility with geo-stationary tracking relay satellites (for example, the TDRSS system). They are connected to the large beamwidth, low gain antennas 18, 18', one of which is located on the nominally nadir (earthward) and the other on the zenith (skyward) oriented side of the main structural column 12. The transmitter and receiver 126 are switched via switches 128, 130 to the nadir pointing antenna 18 for direct transmission to the ground station. They are switched to the zenith pointing antenna 18' for communication via geostationary satellites. This configuration provides high data rate communication through either medium. Each antenna alone provides nearly hemispheric coverage from its vantage point. nearly hemispheric coverage from its vantage point. Both antennas 18 and 18' can be switched on simultaneously if desired so that full coverage can be achieved. This omni-directional coverage is a useful capability in the event that spacecraft attitude cannot be determined and it is necessary to re-establish communications. A backup transmitter and receiver operate in the UHF band, and provide backup communications capability in the event of a primary communications system fault. They are connected to an omni-directional antenna which is deployed following launch. The UH/FRF system is normally inactive. All of the RF components are conventional and are available from ARINC, Aydin-Vector, and other manufacturers.

Spacecraft orientation relative to earth is maintained via the conventional guidance and attitude control system 60 and the associated interface 124. The attitude control system 60 includes standard components which are configured for this application, including 3 momentum wheels 132 oriented about orthogonal axes which provide yaw, pitch, and roll capability; torque rods 134 which are electromagnets and which provide roll, pitch, or yaw moments by means of the coupling between their magnetic moment and the earth's magnetic field, and which may be used to orient the MMSB 10 and to unload the momentum wheels; magnetometers 136, 138 which sense the ambient magnetic field; the sun sensor 26 which determines the angular orientation of the sun relative to the MMSB; the horizon crossing indicator 28 which locates the earth's horizon relative to the MMSB; and the interface 124 that manages the attitude control system functions in response to commands generated by the single board computer 110 (or ground station).

This apparatus provides not only the ability to orient the MMSB 10 relative to the position of the earth, but also provides the data required to orient the solar arrays 16 into a position normal to the sun's incidence and also to orient the spacecraft relative to absolute position and time in response to pre-programmed or interactive operator commands. By this means the MMSB 10 may be positioned at arbitrary angles relative to earth or inertial space, affording the opportunity to point the subsidiary attached payloads 14 or 14' at either inertially fixed coordinates or at some other arbitrary geocentric or spacecraft centered coordinates. Altitude control systems and components of this type are available from many vendors, including Ball Aerospace, Fairchild, ITHACO, and Bendix division of Allied Signal.

As will be explained further below, power is supplied to the system components of FIG. 7 through the use of solar panels 16, charge regulators 140, 142 and battery packs 144, 146 (corresponding to battery stack 62 shown in FIG. 6). Power is distributed via the power control unit 64 and power bus 108. Solar array drivers (not shown) orient the solar panels 16 towards the sun.

The system uses an open architecture 100 which can be driven by any one of a variety of computers. By means of this configuration the subsidiary attached payloads 14, 14' may be controlled on either a time-based or event-based schedule, to meet the individual needs of a particular payload. The MMSB architecture offers unprecedented flexibility in payload accommodation. In an exemplary embodiment of the present invention, system transparency is effected in ground station to payload communications and data exchange since conventional communications protocols and data interchange formats are utilized.

The digital subsystem architecture 100 is based in part on the approved IEEE Standard (ANSI/IEEE Std. 1296-1987). This standard provides for a disciplined processor independent, digital control system supported by numerous vendors in the electronics industry. The mechanical standard is based on the Eurocard form factor and DIN 41612 connectors. The digital subsystem backplane provides the capability to define the electrical and physical parameters for a parallel system bus, a serial system bus, an I/O system bus and a user defined bus.

Serial busses 102 and 104 provide communication paths, via serial I/O board 114, between the payloads 14, 14' and the ground station or one or more of digital subsystem components 112. By virtue of these serial busses, commands and control information may be passed to the payloads 14 and data may be obtained from the payloads 14 via the serial I/O board 114. For example, with respect to FIG. 15, information may be received from the ground station 126 via receiver 128, coupled to the system bus 148 and then to the RX/TX controller 116. The received information may then be stored in memory 144 and thereafter forwarded to a designated ICU 50 via the serial I/O board 114.

A parallel system bus 148 shown in FIG. 7 is a synchronous general purpose bus that supports the digital control subsystem 112 and communications between the subsystem components 110, 114, 116, 118, 120, 122 and 124 and various peripherals (e.g., the receiver/transmitter 126, the attitude control system 60, etc.). The system bus 148 may, for example, support a 32 bit memory address space, a 16 bit I/O address space, a 16 bit interconnect address space, and an 8 bit message address space consistent with ANSI/IEEE Std. 1296-1987. The parallel system bus 148 may also support 8, 16 and 32 bit processors and is capable of a sustained bandwidth in excess of about 30 megabytes per second. System level communications, high speed data movement, memory control, and other system specific tasks occur on the parallel system bus 148.

The backplane in an exemplary embodiment of the present invention can physically accommodate up to 21 function specific, printed circuit board level products. Circuit boards, each consisting of a bus interface and on-board functions, are interconnected to the backplane via backplane interconnections 150. Appropriate bias voltages are coupled to the digital subsystem 110 via power plane interconnection 152.

Slot numbers in the backplane are geographically preassigned via system software. Upon system initialization, slot ID's are assigned by the central service module 146 which scans the backplane to verify which slots contain boards. System software then identifies, configures and tests the individual boards in the system.

The above described autoconfiguration has the following advantages: it allows remote diagnostics to be implemented—it permits a single operating system to run various board configurations—and it allows redundant boards to be added to the system to act as in-place spares for boards that fail.

These features allow the MMSB 10 to be configured to accommodate a wide variety of subsidiary attached payload electronic control strategies, from direct digital or analog control signals supplied directly to the payload 14 by the ICU 50 or single CPU based systems requiring low speed I/O to multiple processor, high bandwidth based systems providing real time control in a fault tolerant environment.

The serial system buses 102, 104 form part of an asynchronous serial input/output bus providing central processor 110 and inter-attached payload communication via ICU's 50.

Payload services are arbitrated by the computer 110 based on preassigned priorities, which are reprogrammable from the ground once on orbit. To gain access to bus services, a payload arbitration identification code is placed on bus arbitration lines (which are part of the system bus 148). In response to preprogrammed priorities, the controller places the bus services at the payload's disposal. All payloads 14 or 14' requesting access are provided access to a given bus service before any payload, regardless of priority, is given second access. The bus identification tags are recognized by the central service module 116, which operates as a bus arbiter in a manner well known to those skilled in the art. These tags are resident in the central service module 116 and are programmable. The tags are transmitted by the ICU's 50 in response to either analog or digital data generated by the payload 14 or 14', or in response to prestored commands in the computer/controller 110.

Upon system initialization or restart, the MMSB software interrogates the system to determine the electronic configuration of the attached payloads 14, 14'. The electronic configuration found is compared with data stored in a pre-programmed "configuration template" stored, for example, in mass memory module 118. If the electronic configuration data found does not match the configuration template, an error message is generated and the actual electronic configuration is uploaded from the ground station at the next scheduled contact. Errors can be identified and analyzed on the ground, and the MMSB reconfigured to accommodate any discrepancies.

Figure 8:
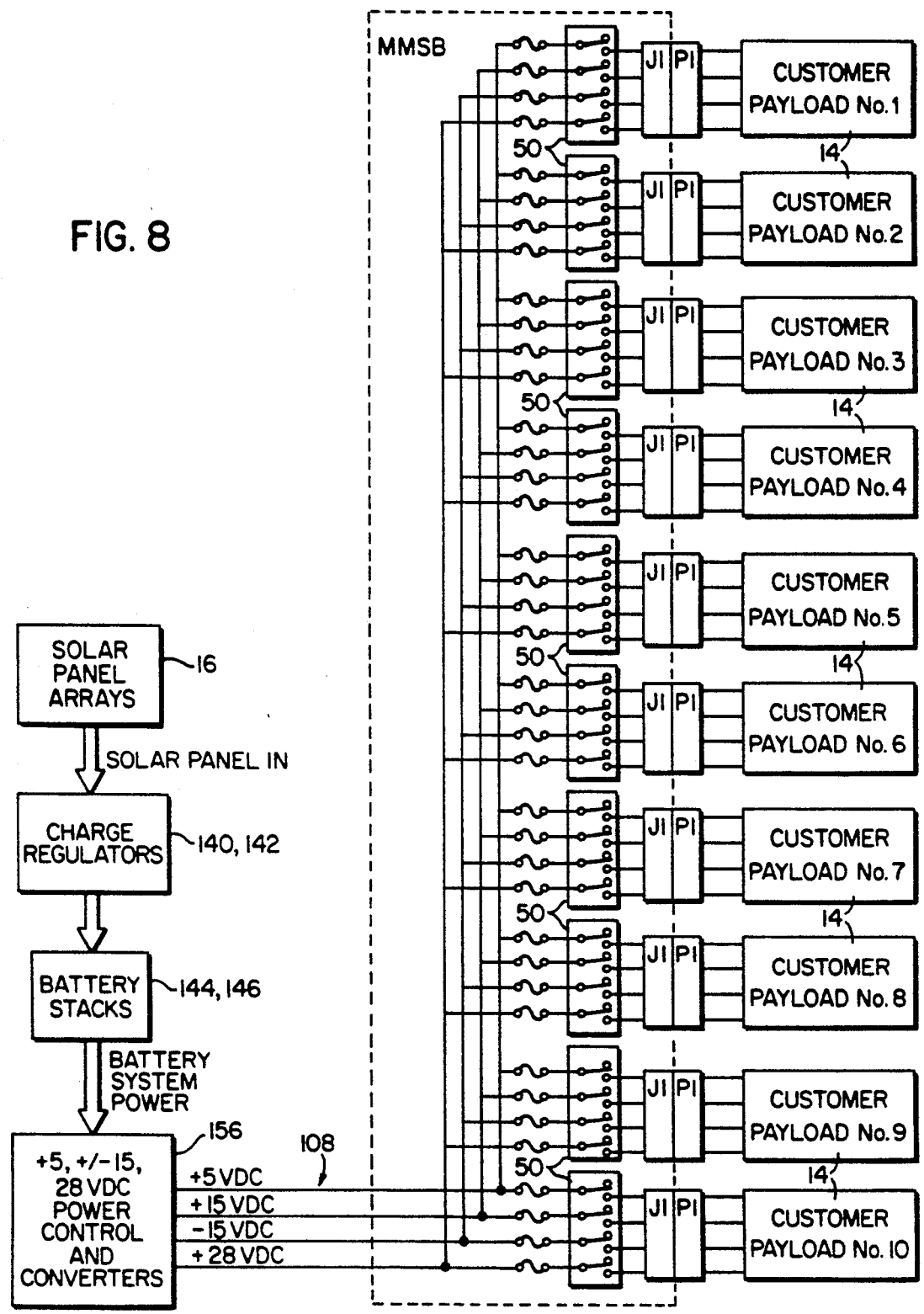
FIG. 8 is a block diagram illustrating connections between a power bus and individual control units of customer payloads.

FIG. 8 shows exemplary connections of the power bus 108 from solar array panels 16 to the battery packs 144, 146 via charge regulators 140, 142. The battery packs 144, 146 are interconnected to a conventional power distribution circuit. FIG. 8 also shows the distribution of various requested voltages as bus services from the power distribution circuit 156 to the ICU's 50 and the distribution of unregulated battery power to the ICU's for high power applications. This architecture provides full power capability to each of payloads 14 or 14' via the ICU's 50 with a minimum of parts and subsidiary power distribution circuits. In this configuration, regulated DC voltages are provided to the subsidiary attached payloads 14, 14' and may be used by it for electrical power to any of its internal components. The power may be further subdivided within the payload as required.

Unregulated power, i.e., the voltage is allowed to float in response to the solar arrays 16 power output and battery charge state, is also supplied to the payloads via the power bus 108. This power will typically be used for electrical heaters, but may be used for any compatible purpose. The payload can be provided with unregulated power in excess of one kilowatt for extended periods, dependent on the battery charge rate and the other demands being placed on the power bus at that time.

The batteries and solar cells are arranged in parallel stacks such that the battery charging requirements match the output of the solar arrays. Rechargeable nickel-cadmium batteries are arranged in stacks of 12 such that the nominal stack output voltage is 18 V. The actual output voltage at any time depends on the charge state and the load. In this configuration, the solar cells are arranged in stacks such that the output voltage is nominally 22 V, but will vary over a wide range depending on the battery charge state, electrical load, and the illumination of solar panels. Such batteries are available from many vendors, including Hughes, Gates, and Panasonic. The solar cells are commercial items and may be purchased from several vendors including Solarex and Slovonic.

The power subsystem may be of a conventional design modified to provide sufficient amounts of DC electrical power to satisfy the MMSB component and subsidiary attached payload requirements. The MMSB power control unit 156 provides the distribution of power to the ICU power system interface. The digital subsystem 112 monitors and maintains direct control of the MMSB power system. Power conditioning can be provided to individual payloads consistent with IEEE industry standards.

The input power is provided by either the batteries or the solar cells, depending on the operating state of the spacecraft. The conversion to standard output voltages, 0, +5 VDC, +15 VDC, −15 VDC, +28 VDC, is accomplished by means of commercial DC/DC voltage convertors, such as those available from Vicor. The power supply outputs are connected to the power bus 108 by which means they are made available to the ICU's 50.

Figure 9:
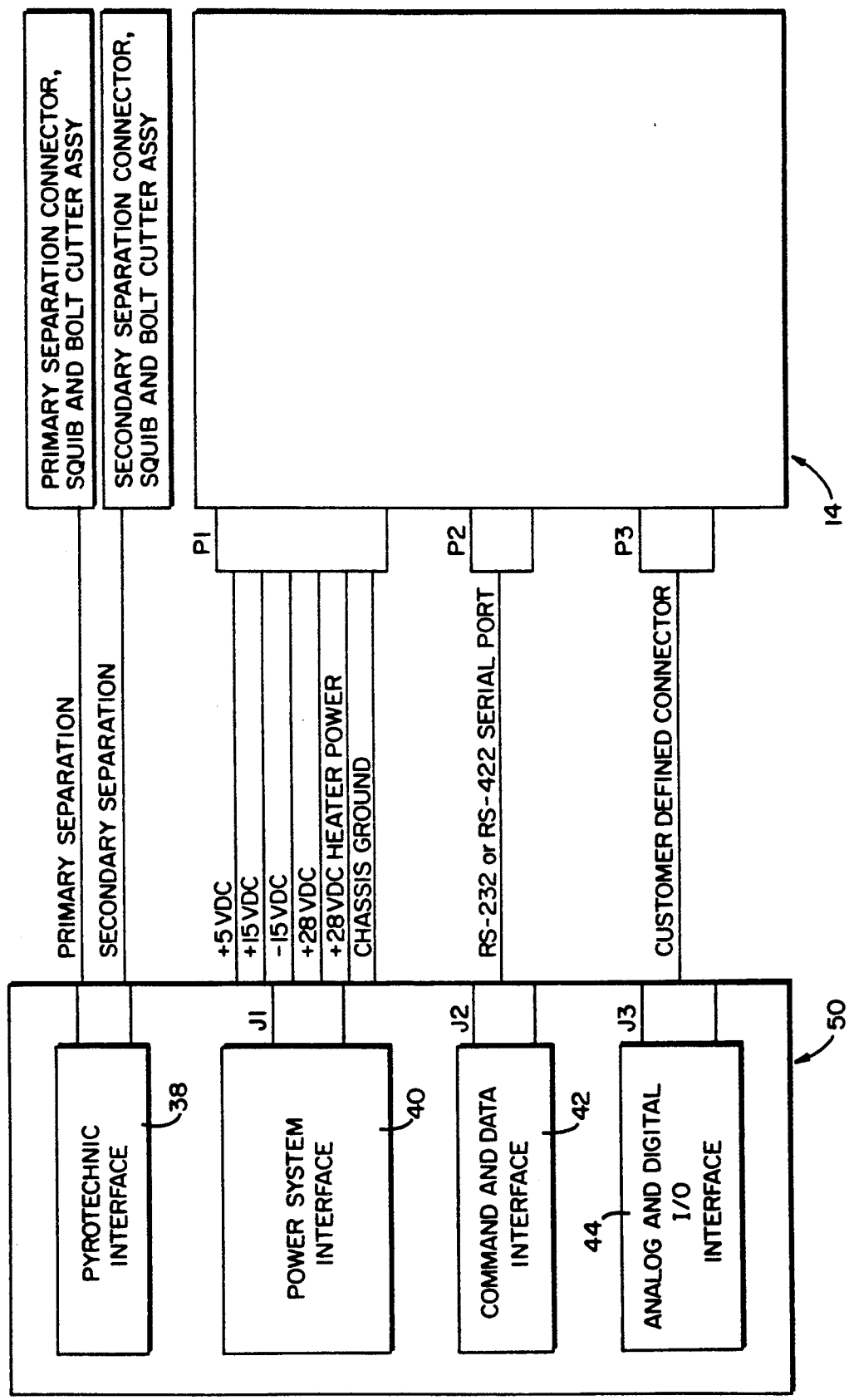
FIG. 9 is a block diagram illustrating the various functions of the interface control units.
Figure 12:
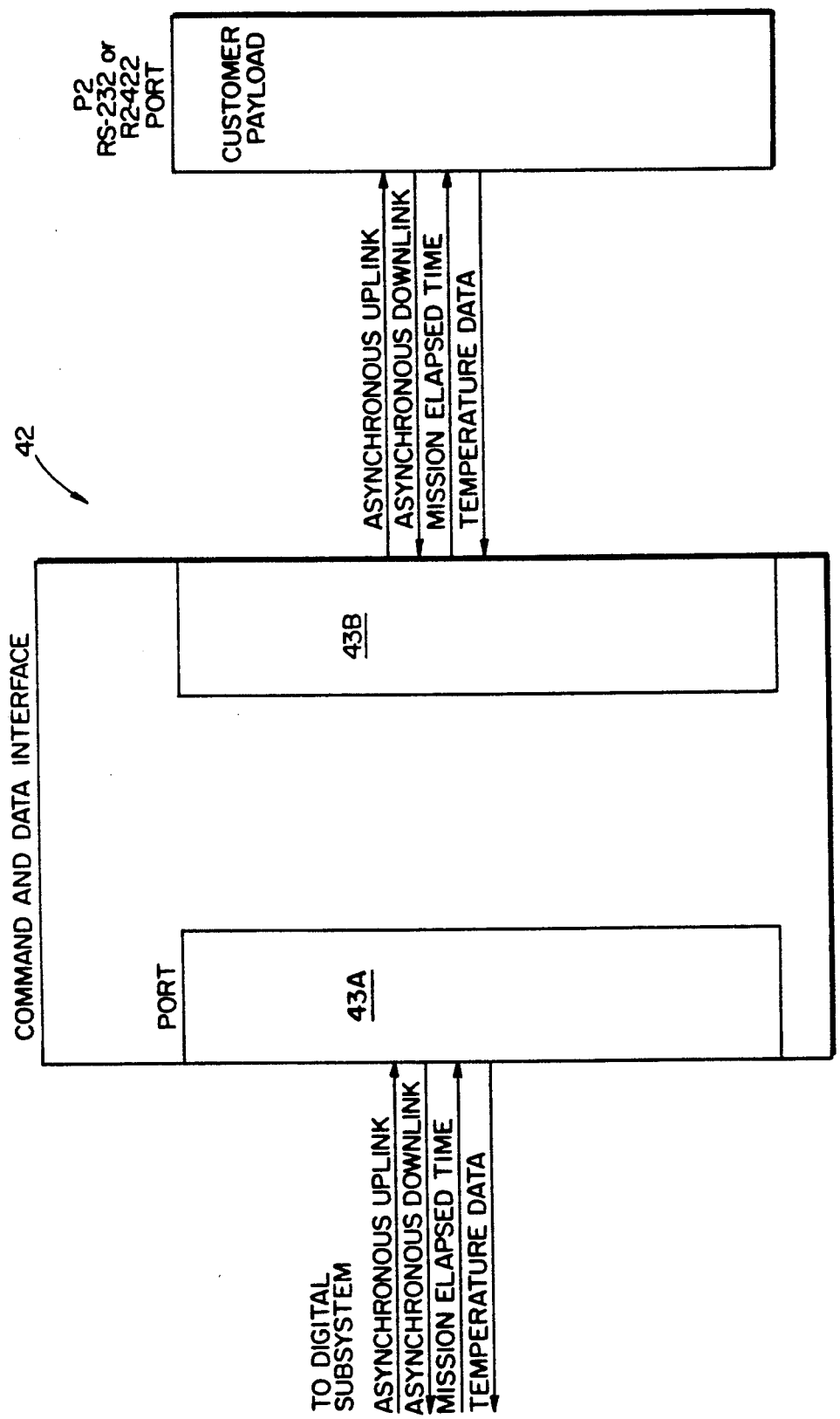
FIG. 12 is a block diagram of the connections of the command and data interface of the control unit.

FIG. 9 shows the functional relationships within the ICU's 50. The command and data interface 42, which is shown in FIG. 12 provides the connection to the data/command bus 104. Interface 42, for example, couples event drive uplink commands to the customer payload and couples event driver information and temperature dates from the payload to the digital subsystem 112. The command and data interface 42 also couplies mission elapsed time data to the payload. This information is communicated, for example, through conventional RS-232 interface ports 43 A, B. Interface 42 also includes a decoder unit (not shown) that consists of conventional digital logic to provide discrete enabling commands upon controller command.

Each ICU 50 provides a direct connection between the data bus 104 and a payload data/command connector 42; while also providing connections to the power bus 108. The ICU 50 includes fuses to isolate the power bus 108 from payload faults, and includes control lines from the decoder to the local power distribution latching relays which enable subsidiary payload power access on command of the central processor 110. A parallel port provides direct connection between the attached payload and the data/command bus 104.

Thus, it will be appreciated that the MMSB 10 provides bus services to multiple subsidiary attached payloads 14 or 14' via interface control units (ICU) 50 associated with each payload interface port 30. The ICU 50 is modular in design such that services provided to a payload 14, 14' can be added or deleted by adding or deleting components in the ICU itself.

Figure 11:
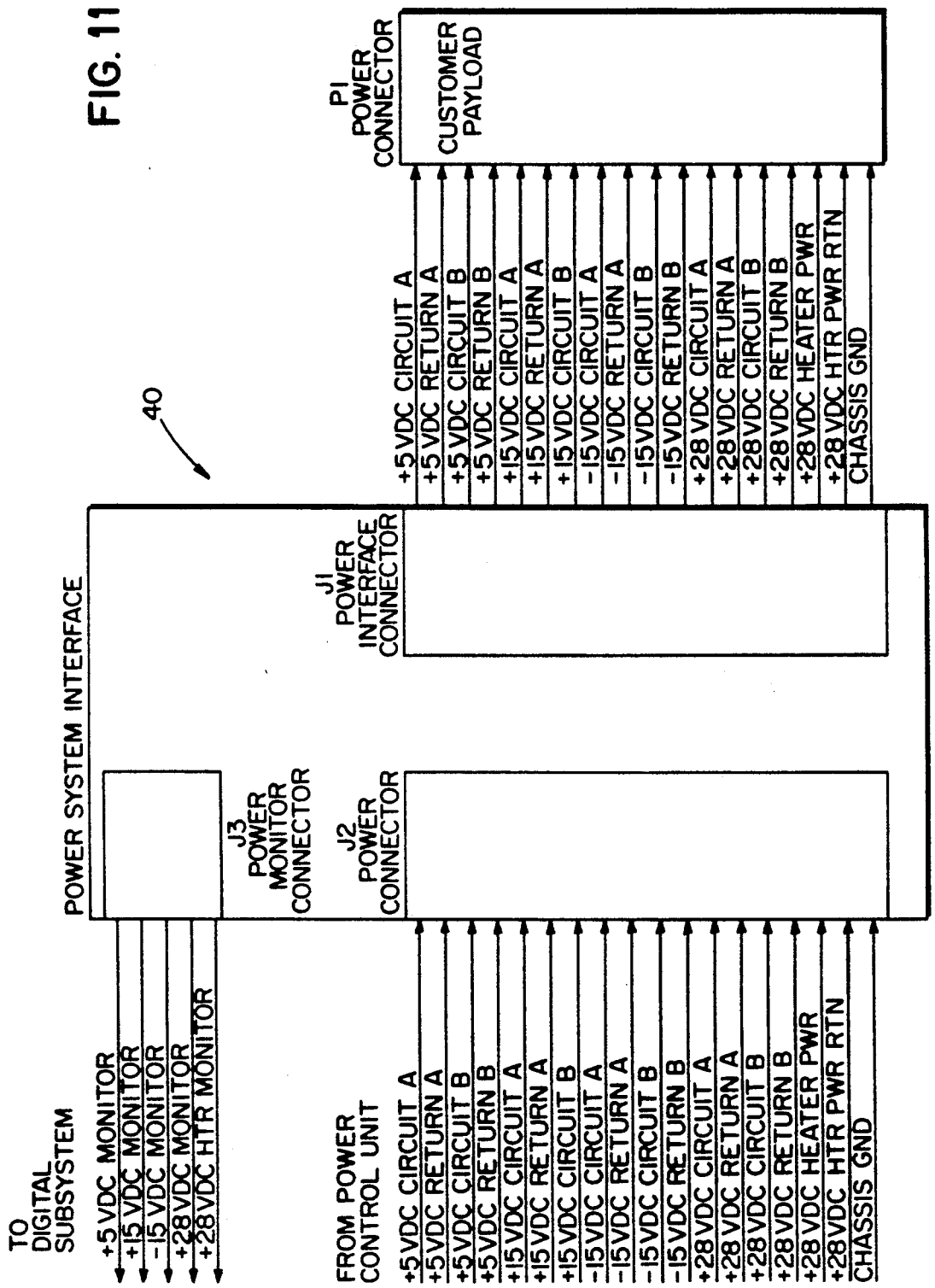
FIG. 11 is a block diagram of the connections of the power system interface of the control unit.

Focussing on the remaining sub-modules in more detail, Power System Interface 40 which is shown in FIG. 11, may, for example, be comprised of conventional connectors PJ1 and PJ2 which are interconnected to provide dual +5 VDC, +/−15 VDC, +28 VDC +/−4 VDC regulated power and +28 VDC unregulated electrical power via dual in-series DPST relays. The digital subsystem 112 monitors payload voltage levels via power monitor connector J3. Each voltage has current measurement capability to be made available to the customer. Voltages are made available based upon customer requirements and system availability and will only be terminated when there is a possibility of damage to a payload 14 or the MMSB. All voltage circuits are protected by in-line fuses 50% vacuum derated with the maximum current load being 10 amps.

Figure 13:
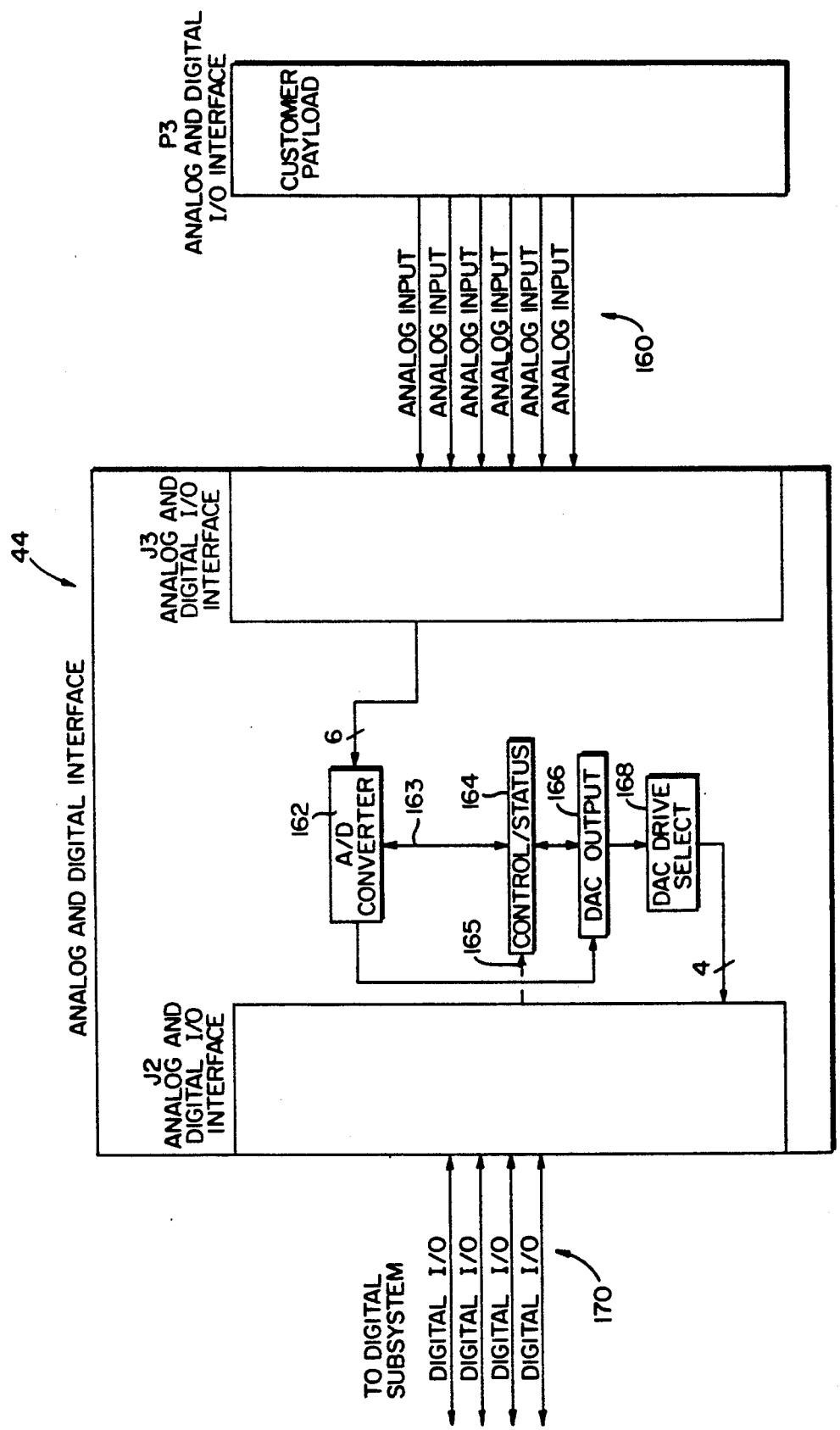
FIG. 13 is a block diagram of the connections of the analog/digital interface of the control unit.

Analog and Digital I/O Interface 44, as is shown in FIG. 13 provides, for example, six analog inputs 160 that can be configured in a variety of ways depending on user requirements for filtering, attenuation, differential inputs and signal cross referencing which are then channelled to A/D converter 162 via a conventional connector J3. A/D converter 162 begins converting upon receiving a request for the conversion via control line 163. The request for conversion may emanate either from the ground station or the digital subsystem 112. The control/status unit 164 may, for example, be comprised of one or more latches, for receiving a latching control signal via digital input/output lines 170 connectors J2 and control line 165. When the request is received on control line 165, the A/D converter 162 proceeds with the conversion and latches the digital data into an output register 166, which can then be read by the system bus 111 after the data is coupled to the serial I/O board 114. Four digital input/outputs line 170 are fed via connector J3 by either voltage or current drivers (not shown) with the output drive strappable for either 0-10 V voltage drive or 0-20 mA current drive. The DAC drive select 168 serves to select either a current or voltage driver output.

By using a double buffered D/A converter a synchronous output is created via onboard clock which is made available to the system bus 148. Command and data interface 42 is an asynchronous serial I/O port, which may, for example, simply be comprised of a plurality of connectors, provides command, control and data passing functions. If, for example, payload temperature data is required by the ground station or the computer controller 110, the request is made through the I/O board 114 to the ICU analog/digital interface board 44. The request would then latch the A/D converter 162 to obtain the required conversion. The data then is buffered in output register 166. At such time, the I/O bus is assigned to the requesting unit and the buffered data is appropriately accessed. The I/O serial board 114 is system software configurable to switch between RS-232 and RS-422 drivers. Payload telemetry may be passed via the command and data interface 42 or via the analog and digital I/O interface 44. MMSB telemetry is available on the digital system bus 148 and is made available to the customer on request. Payload inter-communication is controlled by the digital subsystem 112 via this port.

Interface 44 also includes, for example, a 16 bit digital to analog converter (not shown) for providing up to 8 reference voltages to the attached subsidiary payloads 14, 14'.

Figure 10:
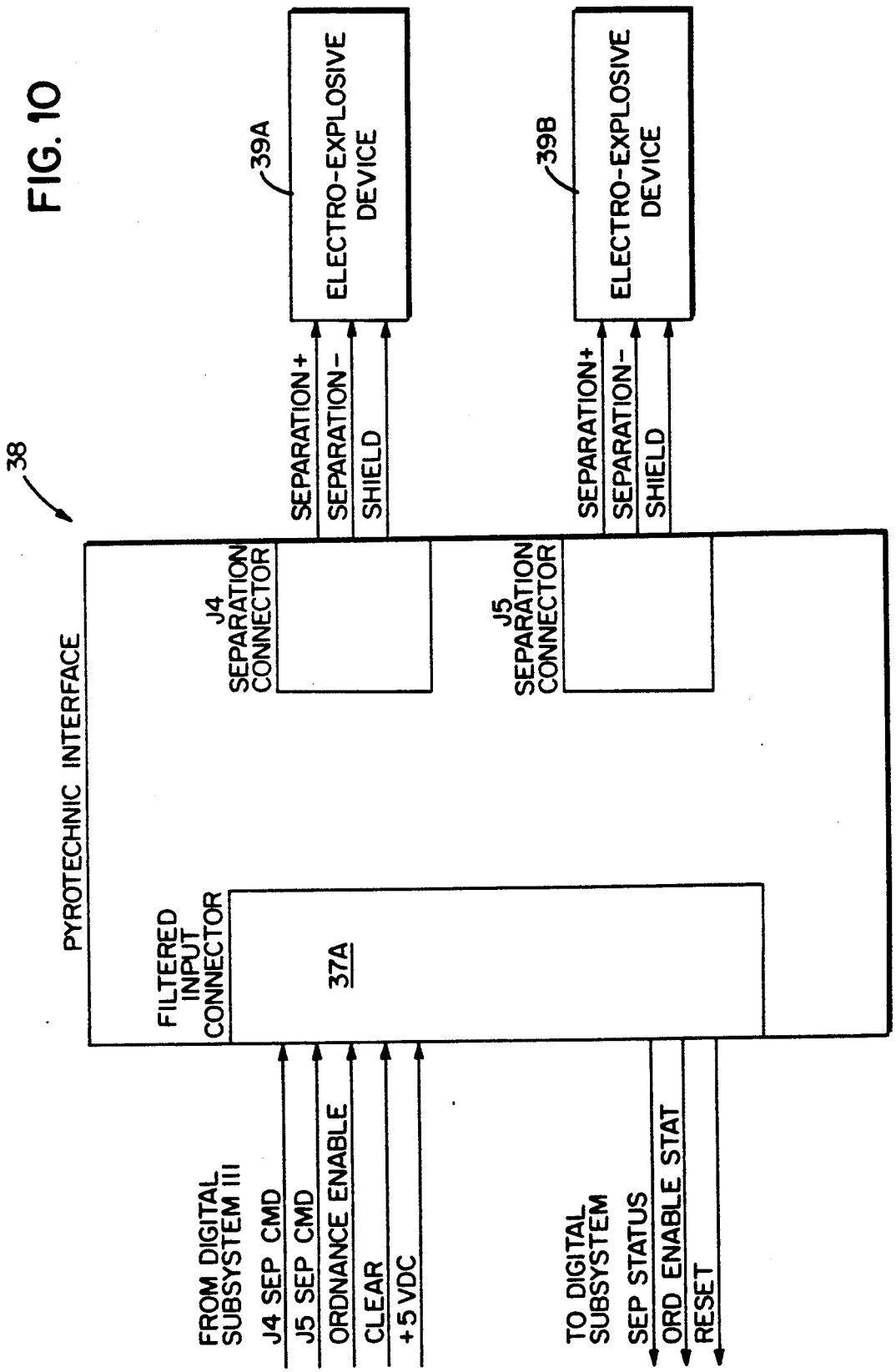
FIG. 10 is a block diagram of the connections of the pyrotechnic interface of the control unit.

Pyrotechnic interface 38, which is shown in FIG. 10, provides switchable firing current to electro-explosive devices (EED) 39 A, B for customer payload separation from the MMSB on command from the digital subsystem 112 via connector 37A and J4 or J5. The EED control logic and firing relays are housed in an RFI/EMI shielded enclosure to isolate the firing circuits from environmental radiation to prevent inadvertent firing of the EED's. Interface 44 also couples status information to the digital subsystem 112 via connector 37A. The pyrotechnic interface 38 may, for example, be of the type manufactured by Ball Space Systems, Inc.

Each payload 14, 14' must arbitrate for system services via its associated ICU 50 interconnect to the system bus 148 under the control of central service module 116. To gain control of a system service, the payload via, for example, the payload UART 19 and command and data interface 42, places its arbitration I.D. on the serial bus 102, through the serial I/O board 114 to the bus arbitration lines on the parallel system bus 148. Payload arbitration I.D.s are prioritized by central service module 116 such that all payloads 14, 14' receive bus services in the order of their priority. All payloads receive requested bus services before a higher priority payload receives bus services for a second time. In this fashion a high priority payload is precluded from effectively excluding a lower priority unit from access to requested services. Power system services do not require bus arbitration other than for power on and power off requests.

Upon system initialization, the MMSB software interrogates the system environment to determine the MMSB electronic hardware configuration. This allows the ICU hardware configuration to change without having to rewrite system software to support different multiple payload configurations. ICU configurations can be changed rapidly to support different payload configurations without impacting the MMSB system architecture.

Figure 14:
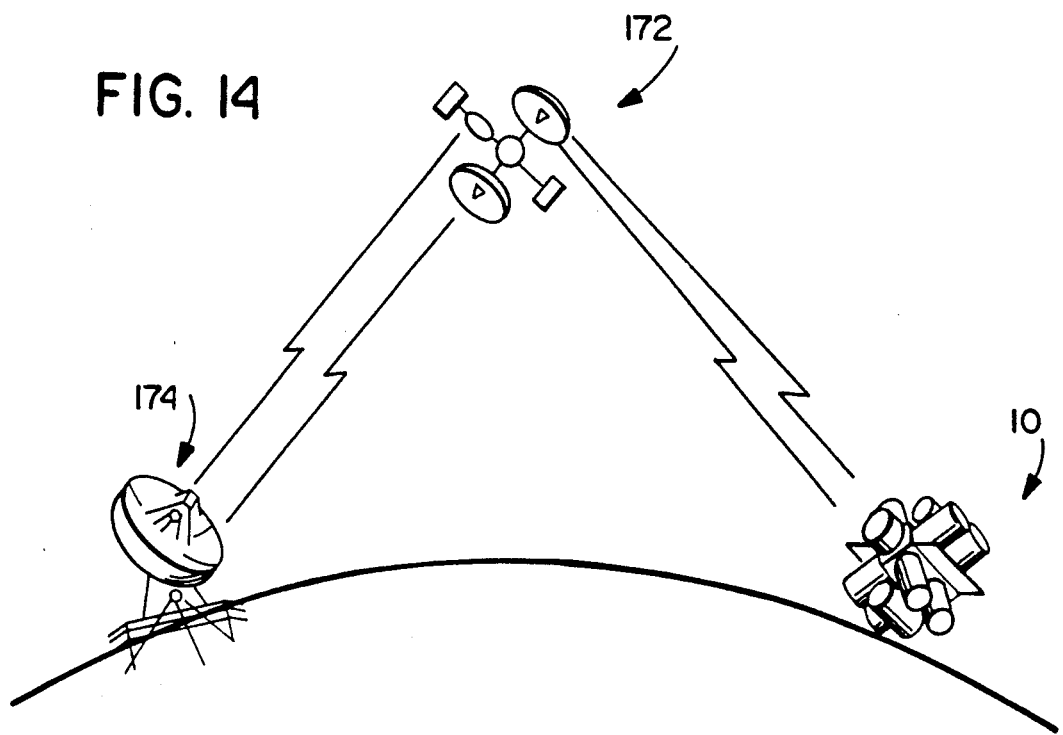
FIG. 14 is a diagrammatic representation of the manner in which the modular satellite bus in accordance with this invention communicates with a tracking station.

FIG. 14 depicts communications with the MMSB 10 in a low orbit via a geostationary satellite. The MMSB transmits to the geostationary satellite 172 by means of the low gain S-band antenna. The geostationary satellite 172 receives the signal and re-broadcasts it to a ground station 174. The signal is then relayed via terrestrial links to the command ground station (not shown), where the data is received and acted on by the operator. The command ground station then transmits a signal back to the ground station 174 via terrestrial links, then to the geostationary satellite 172, which in turn rebroadcasts it to the MMSB 10. The data is routed into the computer/controller 110 and then sent out on the data/command bus 104 to the appropriate attached payload 14 or 14'. This system is very rapid, and by this means data relay to the command ground station or real-time control of subsidiary attached payloads can be accomplished.

Figure 15:
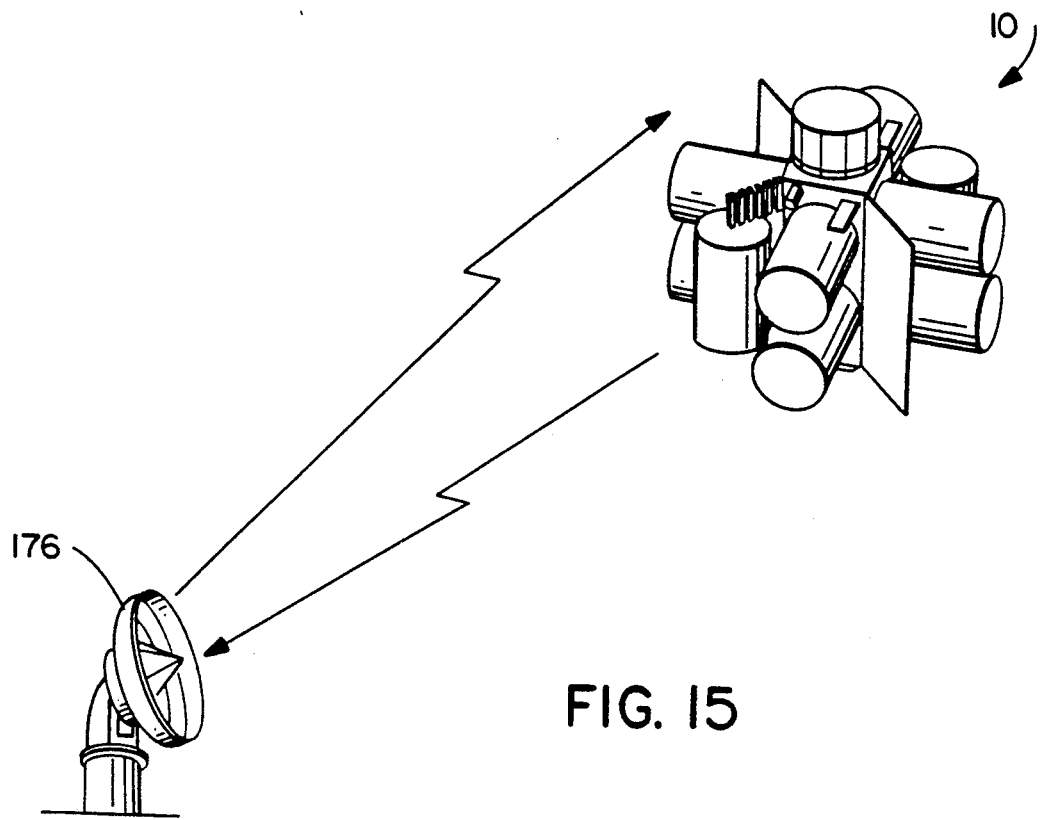
FIG. 15 diagrammatically depicts the manner in which the modular mother satellite bus in accordance with the invention communicates both with tracking stations on earth and other spacecraft.

FIG. 15 shows the MMSB 10 communicating directly with the command ground station 176 by means of its own transmitter and receiver. By this means payload data, MMSB housekeeping data, and telemetry can be transmitted and payload commands and operating instructions can be loaded into the computer/controller 110.

FIGS. 16 A-C are exemplary flowcharts depicting a typical RS-232 asynchronous communication between two separate payloads initiated from a master ground station.

Figure 16A:
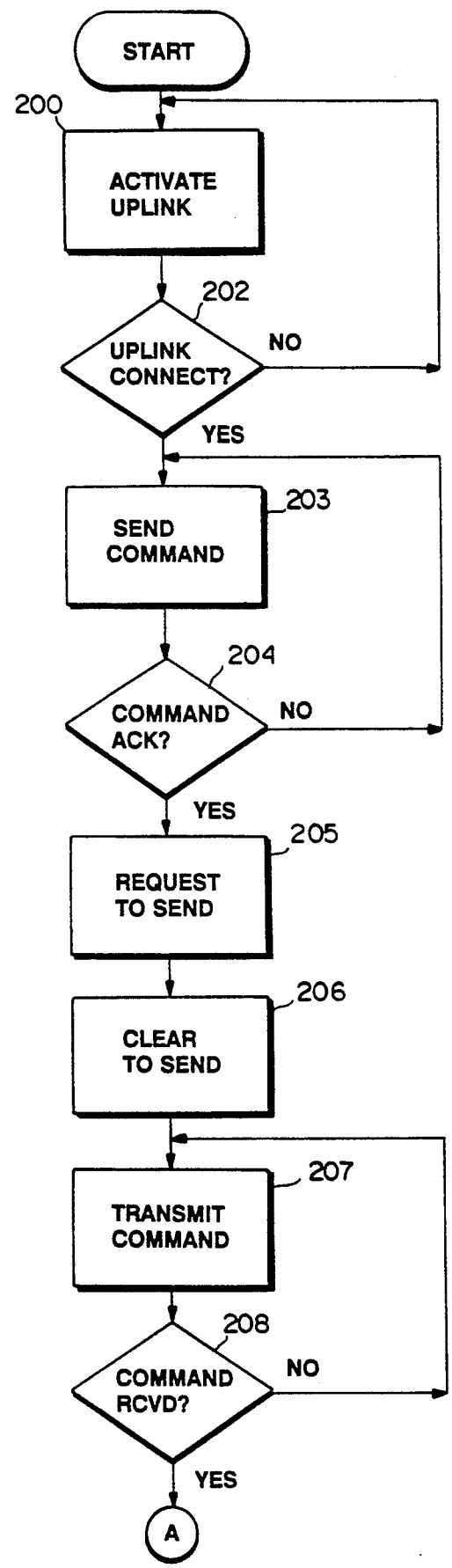
FIGS. 16 A-C are exemplary flow charts illustrating a typical asynchronous communication between two separate payloads.

As shown in FIG. 16A in block 200, communication with the MMSB 10 is established by the ground station sending an activation command signal to activate uplink communication. Thereafter, computer 110 validates the activation command signal and acknowledges validation back to the master ground station (202). If the activate command signal is not acknowledged, the activate command signal is retransmitted.

As indicated by blocks 203 and 204, the master ground station then sends a command that requests payload No. 1 to send a data block to payload No. 2. The payload command received by the computer 110 is validated and acknowledged back to the master ground station. If the command is not acknowledged, it is retransmitted.

Computer 110 then, as indicated at block 205, requests clearance from payload No. 1 to send a command to it via payload No. 1's serial I/O channel. Payload No. 1 is accessed through its command and data interface 42. As indicated in block 206, payload No. 1 then indicates it is ready to receive the command.

Computer 110 of the MMSB digital subsystem 112 sends the command across the parallel system bus 148 to payload No. 1's serial I/O channel which is then received by payload No. 1 (207).

If the command is received, as indicated by block 208, payload No. 1 acknowledges to the single board computer 110 that it received the command. If the command was not received, it is retransmitted to payload No. 1.

Figure 16B:
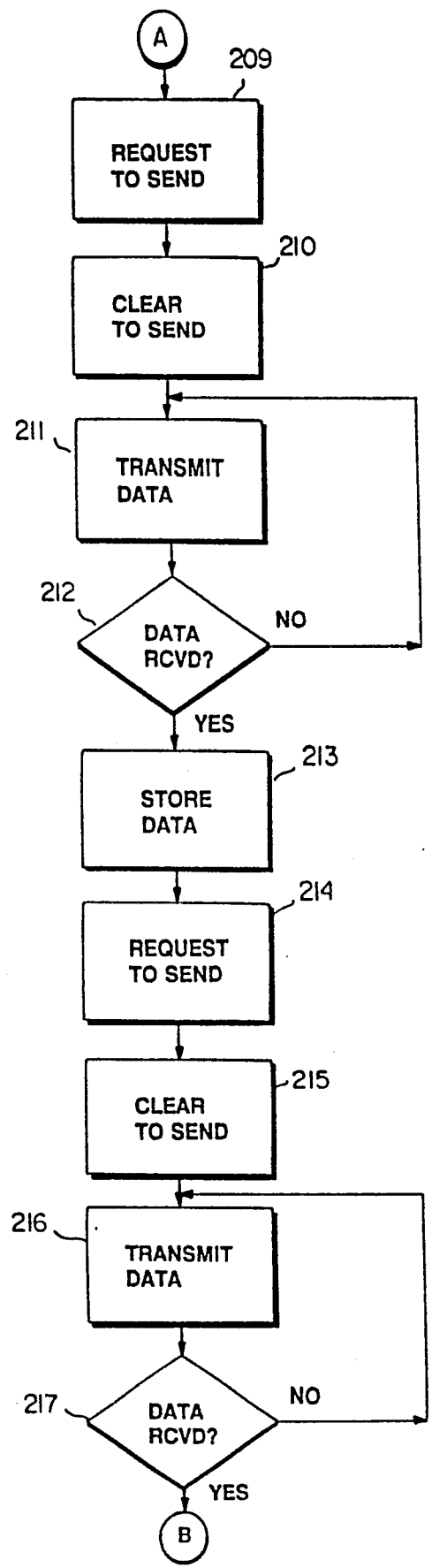

As shown in FIG. 16B, upon receipt of the command, payload No. 1 requests the digital subsystem 112 to allow it to send a data block to payload No. 2 (209). As indicated at block 210, digital subsystem 112 then authorizes payload No. 1 to send a data block to payload No. 2.

Upon receipt of authorization, payload No. 1 sends a data block through its command and data interface 42 across its serial I/O channel to payload No. 2 via its serial I/O channel and corresponding command and data interface, after payload No. 2 has acknowledged and cleared that it is ready to receive the data block (211).

As indicated at block 212, payload No. 2 acknowledges the receipt of the data block to payload No. 1 via the serial I/O channel link already established by the digital subsystem 112 between the two payloads. If the data was not properly received, the data block is retransmitted.

Payload No. 2 then stores the data block from payload No. 1 (213) payload No. 2 may process this data so that the results may be sent to the master ground station as post-processed information. This processed data may, for example, be used to indicate the status of payload No. 1.

Thereafter, payload No. 2 requests the digital subsystem 112 to allow it to send a data block to the master ground station (214). The digital subsystem 112 then authorizes payload No. 2 to send a data block to the master ground station (215).

As indicated at block 216, payload No. 2 then sends a data block to the digital subsystem's memory 118 for temporary storage prior to being transmitted to the master ground station, via payload No. 2's command and data interface (42).

In accordance with block 217, the digital subsystem 112 acknowledges to payload No. 2 that it received the data block (payload No. 1 status). If the data block is not correctly received, payload No. 2 retransmits the data block.

As shown in FIG. 16C, the digital subsystem 112 then turns on the MMSB transmitter via RX/TX controller 120 (218).

Thereafter, the MMSB establishes the downlink connect with the master ground station and tells the master ground station it is ready to send a data block (e.g., payload No. 1 status). The master ground station tells the MMSB it is ready to receive the data block (219). This operation is repeated until the downlink connection is made and appropriately acknowledged.

As indicated in block 220, the MMSB sends the data block to the master ground station from the digital subsystem's memory 118 via the MMSB receiver/transmitter 126.

The master ground station then acknowledges receipt of the data block from the MMSB (221). If the data block was not received, it is retransmitted. The MMSB then goes into a standby mode, wherein it may perform all necessary MMSB processing and control operations but where it is ready for the next command (222).

From the above description, it will be appreciated that the subject invention provides a modular system which enables multiple payloads to be attached via modular, standardized interface and control units to a central bus for providing continuous services to the individual payloads during orbit. As a result, customers can schedule launches more efficiently with cost sharing for the launch vehicle, support services, ground stations, etc., in a manner heretofore unavailable in the space industry.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A self-contained, unmanned spacecraft adapted to be launched into space by a launch vehicle and subsequently separated therefrom, the spacecraft adapted to carry one or more subsidiary attached payloads and to provide bus services to each of said one or more payloads upon separation of the spacecraft from the launch vehicle, the spacecraft comprising:

a main structural body;

one or more standardized mechanical and electronic interface means for mechanically and electronically attaching each of said one or more subsidiary attached payloads to said main structural body of the spacecraft;

means operative through said interface means for controlling the function of each of said one or more subsidiary payloads;

means operative through said interface means for providing spacecraft electric power and computer/controller and data bus resources to each of said one or more subsidiary attached payloads;

means operative through said interface means for retrieving data from said one or more subsidiary attached payloads; and means for permitting communication between the spacecraft and external source.

2. A spacecraft according to claim 1 and including industry-standard open architecture digital subsystem configurations to implement said means for controlling the function of said one or more subsidiary attached payloads.

3. A spacecraft according to claim 1 and including industry-standard open architecture digital subsystem configurations to provide access for said one or more subsidiary attached payloads to said computer/controller and data bus resources means.

4. A spacecraft according to claim 1 and including industry-standard open architecture digital subsystem configurations to provide payload access to said means for retrieving data from said one or more subsidiary attached payloads.

5. A spacecraft according to claim 1 and including industry-standard open architecture digital subsystem configurations.

6. A spacecraft according to claim 5 wherein said interface means comprises one or more preconfigured mechanical, electrical, and electronic interfaces is defined independently of payload specification such that the said one or more subsidiary attached payloads may be built substantially in conformity with the said one or more preconfigured interfaces.

7. A spacecraft according to claim 6 and wherein said means for mechanically and electronically attaching each of said one or more attached payloads to said main structural body comprises industry-standard electrical connectors.

8. A spacecraft according to claim 6 and wherein said means for mechanically and electronically attaching each of said one or more attached payloads to said main structural body comprises industry-standard mechanical connectors.

9. A spacecraft according to claim 1 and also comprising means for metering bus services provided to said one or more subsidiary attached payloads.

10. A spacecraft according to claim 1 wherein said interface means comprises one or more preconfigured mechanical, electrical, and electronic interfaces defined independently of payload specification such that the said one or more subsidiary attached payloads may be built substantially in conformity with the said one or more preconfigured interfaces.

11. A spacecraft according to claim 10 and wherein said means for mechanically and electronically attaching each of said one or more attached payloads to said main structural body comprises industry-standard electrical connectors.

12. A spacecraft according to claim 10 and wherein said means for mechanically and electronically attaching each of said one or more attached payloads to said main structural body comprises industry-standard mechanical connectors.

13. A spacecraft according to claim 1 wherein said means for providing spacecraft electric power and computer/controller and data bus resources comprises one or more distributed controllers.

14. A spacecraft according to claim 13 including a standard modular interface control unit for each of said one or more attached subsidiary payloads.

15. A spacecraft according to claim 14 wherein said interface control units are each accessible from the exterior of said spacecraft and may be reconfigured for individual payloads.

16. A spacecraft according to claim 15 wherein integral connectors are provided such that connections with said spacecraft electric power and computer/controller and data bus resources for any one of said attached subsidiary payloads is established by mechanically attaching one or more associated interface control unit subassemblies to said main spacecraft and broken by mechanically removing said one or more associated interface control unit subassemblies.

17. A spacecraft according to claim 15 and which includes means for adaptation of said interface control units to accommodate one or more particular payload characteristics.

18. A spacecraft according to claim 1 and wherein said means for mechanically and electronically attaching each of said one or more attached payloads to said main structural body comprises industry-standard electrical connectors.

19. A spacecraft according to claim 1 and wherein said means for mechanically and electronically attaching each of said one or more attached payloads to said main structural body comprises industry-standard mechanical connectors.

20. A spacecraft according to claim 1 adapted to carry two or more attached subsidiary payloads.

21. A spacecraft according to claim 20 and including
means for separating one or more of said attached subsidiary payloads from the spacecraft main structural body after a predetermined period of attachment following launch; and
means for continuing to provide said bus services to remaining attached subsidiary payloads following separation of said one or more payloads.

22. A spacecraft according to claim 21 and wherein said means for mechanically and electronically attaching each of said one or more attached subsidiary payloads to said main structural body comprises industry-standard mechanical connectors.

23. A spacecraft according to claim 20 and including industry-standard open architecture digital subsystem configurations to provide means for providing electronic data produced by said one or more attached subsidiary payloads to one or more other of said attached subsidiary payloads.

24. A spacecraft according to claim 23 and providing means for controlling the function of said one or more attached subsidiary payloads dependent on one or more of electronic data retrieved from said one or more other attached subsidiary payloads.

25. A spacecraft according to claim 20 and providing means for modifying the operation of one or more of said attached subsidiary payloads dependent on one or more of electronic data retrieved from said one or more other attached subsidiary payloads.

26. A spacecraft according to claim 20 and providing means for metering bus services.

27. A spacecraft according to claim 20 and which provides said bus services by means of one or more distributed controllers.

28. A spacecraft according to claim 27 wherein said interface means comprises a standard modular interface control unit for each of said one or more attached subsidiary payloads.

29. A spacecraft according to claim 28 wherein said interface control units are accessible from the exterior of said spacecraft and may be reconfigured for said one or more individual payloads by removal and substitution of one or more appropriate components or subassemblies, thereby allowing integration into and interconnection of diverse payload types onto said spacecraft without reconfiguring internal electronics of said spacecraft.

30. A spacecraft according to claim 27 wherein said interface means further comprises integral connectors such that connections with said spacecraft electrical power and data/command services for any one of said attached subsidiary payloads is established by mechanically attaching one or more said associated interface control unit subassemblies to said main spacecraft body and broken by mechanically removing said associated interface control unit subassemblies.

31. A spacecraft according to claim 20 and which also provides means for functional coupling and integration of two or more discrete payload subelements such that the functionally integrated aggregate payload may be comprised of dispersed payload subelements, each of which subelements is itself an attached subsidiary payload.

32. A spacecraft according to claim 20 and which also provides means for functionally integrating said attached subsidiary payload through one or more spacecraft buses.

33. A spacecraft according to claim 20 and which also provides means for functionally integrating two or more combined payload elements through one or more direct connections between the discrete payload elements, each of which is itself one of said attached subsidiary payload.

* * * * *